(12) United States Patent
Maezawa

(10) Patent No.: US 11,468,651 B2
(45) Date of Patent: Oct. 11, 2022

(54) SIZE MEASURING SYSTEM

(71) Applicant: ZOZO, Inc., Chiba (JP)

(72) Inventor: Yusaku Maezawa, Chiba (JP)

(73) Assignee: ZOZO, Inc., Chiba (JP)

( * ) Notice: Subject to any disclaimer, the term of this patent is extended or adjusted under 35 U.S.C. 154(b) by 62 days.

(21) Appl. No.: 17/043,230

(22) PCT Filed: Mar. 29, 2019

(86) PCT No.: PCT/JP2019/014227
§ 371 (c)(1),
(2) Date: Sep. 29, 2020

(87) PCT Pub. No.: WO2019/189846
PCT Pub. Date: Oct. 3, 2019

(65) Prior Publication Data
US 2021/0375060 A1 Dec. 2, 2021

(30) Foreign Application Priority Data

Mar. 30, 2018 (JP) .............................. JP2018-068694

(51) Int. Cl.
G06T 19/20 (2011.01)
G06T 7/62 (2017.01)
(Continued)

(52) U.S. Cl.
CPC .............. G06T 19/20 (2013.01); A41H 1/02 (2013.01); A41H 3/04 (2013.01); G06T 7/62 (2017.01);
(Continued)

(58) Field of Classification Search
None
See application file for complete search history.

(56) References Cited

U.S. PATENT DOCUMENTS 6,549,639 B1 4/2003 Genest
6,621,921 B1 9/2003 Matsugu et al.
(Continued)

FOREIGN PATENT DOCUMENTS

EP 2747593 A1 7/2017
JP 9-170914 6/1997
(Continued)

OTHER PUBLICATIONS

International Search Report for related International Application No. PCT/JP2019/036402 dated Nov. 19, 2019 and its English translation.
(Continued)

Primary Examiner — Frank S Chen
(74) Attorney, Agent, or Firm — Renner, Otto, Boisselle & Sklar, LLP

(57) ABSTRACT

This size measuring system has: a size measuring instrument 10 which has, disposed on the surface thereof, a plurality of identifiable markers and which is attached to the body of a user when measuring the size of the body of the user; a measurement terminal 20 which measures the size of the body of the user by photographing the user having the size measuring instrument 10 attached thereto; a business operator terminal 30 which is operated by a provider providing the size measuring instrument 10; and a product data management server 40 which stores therein a database of product data including size information of products, such as garments to be worn by the user.

10 Claims, 17 Drawing Sheets

(51) Int. Cl.
*A41H 1/02* (2006.01)
*A41H 3/04* (2006.01)

(52) U.S. Cl.
CPC ............... *G06T 2207/30196* (2013.01); *G06T 2207/30204* (2013.01); *G06T 2219/2021* (2013.01)

(56) References Cited

U.S. PATENT DOCUMENTS

| | | | |
|---|---|---|---|
| 6,724,930 | B1 | 4/2004 | Kosaka et al. |
| 2004/0227752 | A1* | 11/2004 | McCartha .............. A41H 3/007 345/419 |
| 2007/0206832 | A1 | 9/2007 | Gordon et al. |
| 2012/0095589 | A1 | 4/2012 | Vapnik |
| 2013/0293686 | A1* | 11/2013 | Blow ........................ G06T 7/55 348/50 |
| 2014/0343628 | A1* | 11/2014 | Kaula ................... G06F 3/0484 607/59 |
| 2016/0071318 | A1* | 3/2016 | Lee ...................... G06V 10/443 345/419 |
| 2016/0071322 | A1 | 3/2016 | Nishiyama et al. |
| 2016/0163104 | A1* | 6/2016 | Hou ........................ G06T 17/00 345/520 |
| 2018/0033202 | A1 | 2/2018 | Lam et al. |
| 2020/0367590 | A1* | 11/2020 | Istook .................. A61B 5/1072 |

FOREIGN PATENT DOCUMENTS

| | | |
|---|---|---|
| JP | 2000227309 A | 8/2000 |
| JP | 2001204511 A | 7/2001 |
| JP | 2002163679 A | 6/2002 |
| JP | 2005256232 A | 9/2005 |
| JP | 200753818 A | 3/2007 |
| JP | 2007267996 A | 10/2007 |
| JP | 201654450 A | 4/2016 |
| JP | 201819843 A | 2/2018 |
| WO | 2013026798 A1 | 2/2018 |

OTHER PUBLICATIONS

Current claims of co-pending related U.S. Appl. No. 17/278,115, filed Mar. 19, 2021.
International Search Report for related International Application No. PCT/JP2019/014227 dated May 14, 2019 and its English translation.
Extended European Search Report for related European Application No. 19776139.8 dated Dec. 1, 2021.
First Examination Report for related Indian Application No. 202047041455 dated Dec. 7, 2021 and its English translation.
First Examination Report for related Indian Application No. 202147018290 dated Feb. 8, 2022 and its English translation.
Loper Matthew et al: "MoSh: motion and shape capture from sparse markers", ACM Transactions on Graphics, vol. 33, No. 6, Nov. 19, 2014, pp. 1-13, XP055862859.
Extended European Search Report corresponding to European Application No. EP19861345.7 dated May 10, 2022.
Japanese Office Action corresponding to Japanese Application No. 2020-548520 dated May 6, 2022 and its English Translation.
New Zealand first Patent Examination Report corresponding to New Zealand Application No. 769366 dated May 10, 2022.

\* cited by examiner

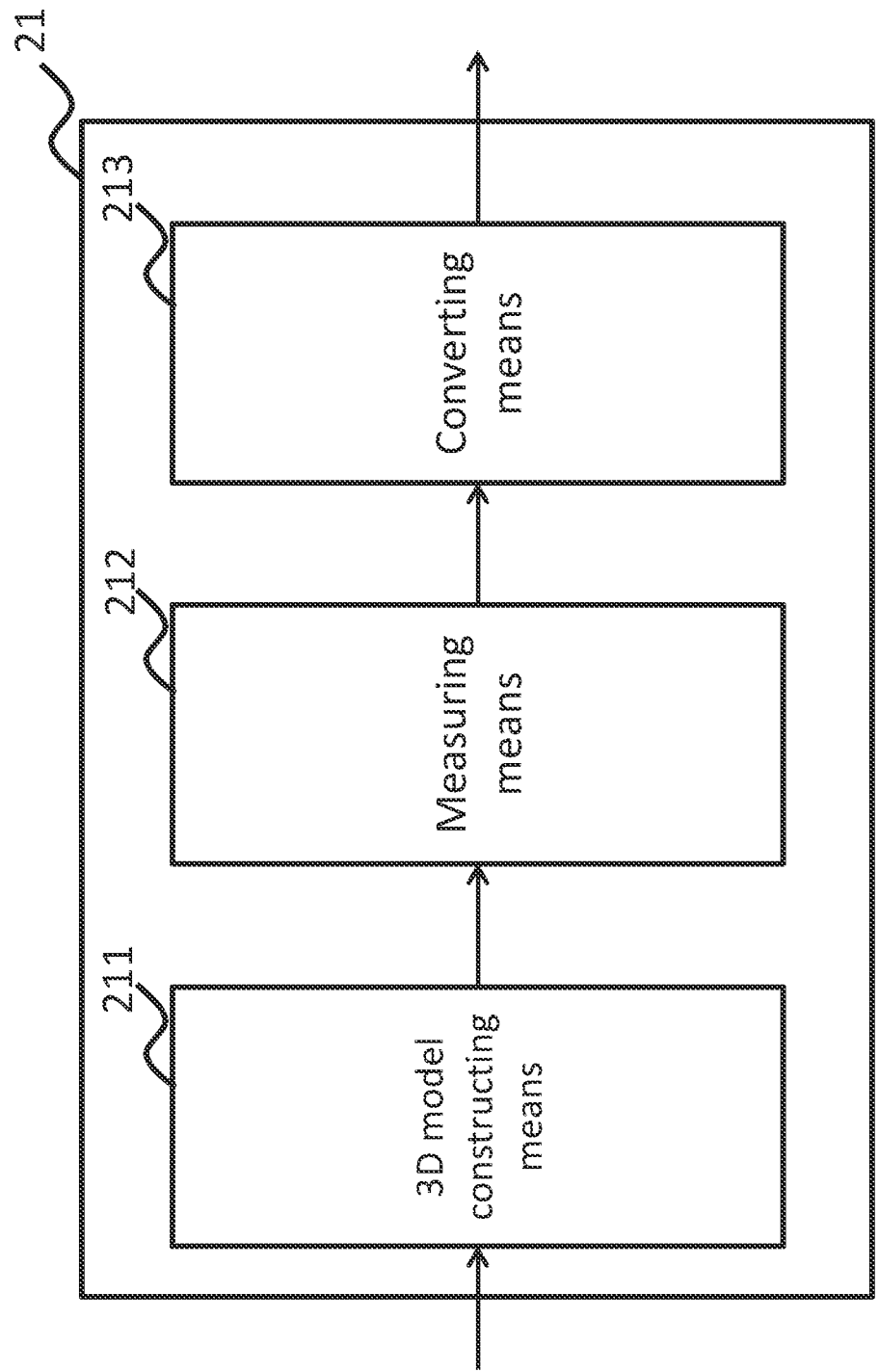

FIG.6

Marker DB 221

| Marker ID | Shape | Size | Design/pattern | Color tone | Material |
|---|---|---|---|---|---|
| 0001 | ... | ... | ... | ... | ... |
| 0002 | ... | ... | ... | ... | ... |
| 0003 | ... | ... | ... | ... | ... |
| 0004 | ... | ... | ... | ... | ... |
| 0005 | ... | ... | ... | ... | ... |
| 0006 | ... | ... | ... | ... | ... |
| 0007 | ... | ... | ... | ... | ... |
| 0008 | ... | ... | ... | ... | ... |
| ... | ... | ... | ... | ... | ... |

FIG.11

Product DB 421

| Product ID | Brand | Product name | Product category | Size information | Color | Price | Number in stock | ... |
|---|---|---|---|---|---|---|---|---|
| 000001 | AAA | ○○ ○○ | Tops, turtleneck | ... | Gray | 1,000 | 12 | ... |
| 000002 | AAA | ○○ ○○ | Tops, turtleneck | ... | Gray | 1,000 | 15 | ... |
| 000003 | AAA | ○○ ○○ | Tops, turtleneck | ... | Gray | 1,000 | 6 | ... |
| 000004 | AAA | ○○ ○○ | Accessory | ... | Silver | 3,200 | 2 | ... |
| 000005 | BBB | ○○ ○○ | Pants | ... | Pink, blue | 1,980 | 8 | ... |
| 000006 | BBB | ○○ ○○ | Pants | ... | Pink, blue | 1,980 | 6 | ... |
| 000007 | BBB | ○○ ○○ | Pants | ... | Pink, blue | 1,980 | 10 | ... |
| 000008 | CCC | ○○ ○○ | Light outerwear | ... | Yellow | 5,200 | 5 | ... |
| ... | ... | ... | ... | ... | ... | ... | ... | ... |

SIZE MEASURING SYSTEM

TECHNICAL FIELD

The present invention relates to a size measuring system. More specifically, the present invention relates to a size measuring system for measuring the size of a three-dimensional object. In particular, the present invention relates to a size measuring system for measuring the size by capturing the three-dimensional shape of the body.

BACKGROUND ART

In recent years, the increased prevalence of Internet technologies has resulted in electronic commerce sites providing various products, leading to continued sales growth.

Users can order a product on an electronic commerce site using a PC, mobile terminal, or the like, and then receive the product that is delivered at home without visiting a brick-and-mortar store. The number of users thereof is increasing drastically due to such convenience.

A large number of such electronic commerce sites provides apparel products such as clothes, hats, and footwear. The number of users thereof is increasing rapidly, which is approaching the number of brick-and-mortar stores.

However, it is unclear in some cases whether such an apparel product actually matches the size or shape of the body of a user upon purchase of the product. After receiving the product, the user needed to try the product on, and if the product does not match the user's size or the like, return the product and reorder a product of a difference size.

The mobile information device disclosed in Patent Literature 1 has been proposed as one of the conventional technologies to solve such a problem.

The mobile information device disclosed in Patent Literature 1 computes the dimension of clothing by capturing an image of the clothing placed on a flat surface and a baseline product with a predetermined dimension, and once the dimension of a part of the body exposed from the clothing when the clothing is worn by a user is inputted, computes the dimension of each part of the body of the user based on the inputted dimension of the exposed part of the body and the dimension of the clothing.

Specifically, if, for example, the clothing is tops, the mobile information device of Patent Literature 1 computes the length of the entire arm of a user by adding the length of a sleeve of the clothing and the length of exposed arm of the user.

The mobile information device of Patent Literature 1 computes the dimension of the shoulder width of clothing directly as the approximate shoulder width of the user.

CITATION LIST

Patent Literature

[PTL 1] Japanese Laid-Open Publication No. 2018-19843

SUMMARY OF INVENTION

Technical Problem

However, use of the mobile information device of Patent Literature 1 entails problems, i.e., users need to measure the dimension of a body part exposed from clothing by themselves using a measuring tape or the like, which is not only cumbersome, but also can be difficult to measure well, thus resulting in low measurement precision.

In addition, the mobile information device of Patent Literature 1 uses the dimension of clothing directly as the dimension of the body of a user. This results in the problem of dramatically lower measurement precision when the clothing is a type of clothing that is meant to be loose-fit clothing.

The present invention was conceived in view of the aforementioned problems. The objective of the present invention is to provide a size measuring system for measuring the size of a three-dimensional object, especially the body size of a user, with a high level of precision without a cumbersome measuring procedure.

Another objective of the present invention is to construct a 3D model reflecting the size of a three-dimensional object with a high precision in order to measure the size of the three-dimensional object with a high level of precision.

Solution to Problem

To achieve such objectives, the present invention is a size measuring system for measuring a body size of a user, characterized by having: a size measuring apparatus comprised of a main body substrate, which is composed of a stretchable material and extends to match a body shape of the user when worn by the user, and a plurality of markers that are inelastic placed on the main body substrate; and a measuring terminal for measuring a body size of the user by recognizing the plurality of markers of the size measuring apparatus being worn by the user and computing three-dimensional coordinates of the plurality of markers.

The size measuring system of the invention is characterized in that the measuring terminal recognizes the plurality of markers from a plurality of directions, computes three-dimensional coordinates of the markers, and computes three-dimensional coordinates of a body surface of the user wearing the size measuring apparatus based on the computed three-dimensional coordinates of the markers.

The size measuring system of the invention further has a provider terminal operated by a service provider providing the size measuring apparatus to the user, wherein the provider terminal is characterized by: storing main body substrate data indicating three-dimensional coordinates representing a shape of the main body substrate and marker data indicating three-dimensional coordinates representing a shape of the markers; placing an image of the markers displayed based on the marker data on an image of the main body substrate displayed based on the main body substrate data and determining a position of the markers on the main body substrate to generate measuring apparatus data indicating three-dimensional coordinates of the size measuring apparatus; and generating pattern paper data for the size measuring apparatus based on the measuring apparatus data.

The size measuring system of the invention further has a management server, which is connected to the measuring terminal via a network and stores a database for managing product data indicating a size of each of a plurality of products that can be worn by the user, characterized in that the measuring terminal transmits information on the measured body size of the user to the management server, and the management server references the database, compares the measured body size of the user with sizes of the plurality of products indicated by the product data, extracts product data of a product with a size, which matches with or is within a predetermined value of, the body size of the user, and transmits the product data to the measuring terminal.

The present invention provides, for example, the following items.

(Item 1)

A computer system for measuring a size of a three-dimensional object, the computer system comprising:

receiving means for receiving an image of a three-dimensional object, the image being an image capturing the three-dimensional object wearing a size measuring apparatus having a plurality of markers, the plurality of markers comprising a unique marker within the size measuring apparatus; and 3D model constructing means for constructing a 3D model of the three-dimensional object by modifying a shape of a default 3D model having a plurality of markers corresponding to the plurality of markers based on the default 3D model and the received image.

(Item 2)

The computer system of item 1, wherein the 3D model constructing means constructs the 3D model of the three-dimensional object by modifying the shape of the default 3D model based on a virtual image obtained from the default 3D model and the received image.

(Item 3)

The computer system of item 2, wherein the 3D model constructing means is configured to:

compute a discrepancy between a plurality of markers within the virtual image and corresponding markers within the received image; and construct the 3D model by modifying the shape of the default 3D model such that the discrepancy is minimized.

(Item 4)

The computer system of any one of items 1 to 3, further comprising:

measuring means for measuring a size in the 3D model; and converting means for converting the measured size into an actual size;

wherein the shape of the default 3D model is modified within a virtual three-dimensional space whose scale with respect to an actual three-dimensional space is predetermined, and wherein the converting means converts the measured size into an actual size by using the scale.

(Item 5)

The computer system of item 4, wherein the scale between the virtual three-dimensional space and the actual three-dimensional space is predetermined by a ratio of a size of a plurality of markers of the default 3D model within the virtual three-dimensional space to a size of the plurality of markers of the size measuring apparatus within the actual three-dimensional space.

(Item 6)

The system of any one of items 1 to 5, wherein the plurality of markers comprise a non-unique marker within the size measuring apparatus, and wherein the 3D model constructing means associates, based on relative positions of the non-unique marker and the unique marker, a non-unique marker within the default 3D model with a non-unique marker within the received image.

(Item 7)

The system of any one of items 1 to 6, wherein the three-dimensional object is a human body.

(Item 8)

The system of any one of items 1 to 7, wherein the unique marker has an identification element, the identification element being a plurality of dots placed in a unique pattern.

(Item 9)

A size measuring system comprising:

the computer system of any one of items 1 to 8, the computer system being a terminal device of a user; and the size measuring apparatus.

(Item 10)

The size measuring system of item 9, wherein the size measuring apparatus comprises a stretchable main body substrate and the plurality of markers placed on the main body substrate, wherein the plurality of markers are inelastic.

(Item 11)

A program for measuring a size of a three-dimensional object, the program being executed in a computer system having a processor, wherein the program instructs the processor to perform processing comprising:

receiving an image of a three-dimensional object, the image being an image capturing the three-dimensional object wearing a size measuring apparatus having a plurality of markers, the plurality of markers comprising a unique marker within the size measuring apparatus; and constructing a 3D model of the three-dimensional object by modifying a shape of a default 3D model having a plurality of markers corresponding to the plurality of markers based on the default 3D model and the received image.

(Item 12)

A method of measuring a size of a three-dimensional object, comprising:

receiving an image of a three-dimensional object, the image being an image capturing the three-dimensional object wearing a size measuring apparatus having a plurality of markers, the plurality of markers comprising a unique marker within the size measuring apparatus; and constructing a 3D model of the three-dimensional object by modifying a shape of a default 3D model having a plurality of markers corresponding to the plurality of markers based on the default 3D model and the received image.

(Item 13)

A size measuring apparatus for measuring a size of a three-dimensional object, the size measuring apparatus being configured to be worn on the three-dimensional object, the size measuring apparatus comprising:

a stretchable main body substrate; and a plurality of markers placed on the main body substrate;

wherein the plurality of markers comprise a unique marker within the size measuring apparatus, and the plurality of markers are inelastic.

(Item 14)

The size measuring apparatus of item 13, wherein the plurality of markers comprise a non-unique marker within the size measuring apparatus.

(Item 15)

The size measuring apparatus of item 14, wherein the non-unique marker is placed on the main body substrate to be located on at least one of a wrist, an ankle, and a neck of the user when the user wears the size measuring apparatus.

(Item 16)

The size measuring apparatus of any one of items 13 to 15, wherein the unique marker has an identification element, the identification element being a plurality of dots placed in a unique pattern.

(Item 17)

A provider terminal operated by a service provider providing a size measuring apparatus to a user, wherein the size measuring apparatus is comprised of a main body substrate, which is composed of a stretchable material and extends to match a body shape of the user when worn by the user, and a plurality of markers that are inelastic placed on the main body substrate, wherein the provider terminal is characterized by:

storing main body substrate data indicating three-dimensional coordinates representing a shape of the main body substrate and marker data indicating three-dimensional coordinates representing a shape of the markers;

placing an image of the markers displayed based on the marker data on an image of the main body substrate displayed based on the main body substrate data and determining a position of the markers on the main body substrate to generate measuring apparatus data indicating three-dimensional coordinates of the size measuring apparatus; and generating pattern paper data for the size measuring apparatus based on the measuring apparatus data.

(Item 18)

A size measuring system having:

a measuring terminal for recognizing a plurality of markers of a size measuring apparatus being worn by a user and computing three-dimensional coordinates of the plurality of markers to measure a body size of the user, wherein the size measuring apparatus is comprised of a main body substrate, which is composed of a stretchable material and extends to match a body shape of the user when worn by the user, and a plurality of markers that are inelastic placed on the main body substrate; and a management server, which is connected to the measuring terminal via a network and stores a database for managing product data indicating a size of each of a plurality of products that can be worn by the user; characterized in that the measuring terminal transmits information on the measured body size of the user to the management server, and the management server references the database, compares the measured body size of the user with sizes of the plurality of products indicated by the product data, extracts product data of a product with a size, which matches with or is within a predetermined value of, the body size of the user, and transmits the product data to the measuring terminal.

(Item A1)

A size measuring system for measuring a body size of a user, characterized by having:

a size measuring apparatus comprised of a main body substrate, which is composed of a stretchable material and extends to match a body shape of the user when worn by the user, and a plurality of markers that are inelastic placed on the main body substrate; and a measuring terminal for measuring a body size of the user by recognizing the plurality of markers of the size measuring apparatus being worn by the user and computing three-dimensional coordinates of the plurality of markers.

(Item A2)

The size measuring system of item A1, characterized in that the measuring terminal recognizes the plurality of markers from a plurality of directions, computes three-dimensional coordinates of the markers, and computes three-dimensional coordinates of a body surface of the user wearing the size measuring apparatus based on the computed three-dimensional coordinates of the markers.

(Item A3)

The size measuring system of item A1 or A2, further having a provider terminal operated by a service provider providing the size measuring apparatus to the user, wherein the provider terminal is characterized by:

storing main body substrate data indicating three-dimensional coordinates representing a shape of the main body substrate and marker data indicating three-dimensional coordinates representing a shape of the markers;

placing an image of the markers displayed based on the marker data on an image of the main body substrate displayed based on the main body substrate data and determining a position of the markers on the main body substrate to generate measuring apparatus data indicating three-dimensional coordinates of the size measuring apparatus; and generating pattern paper data for the size measuring apparatus based on the measuring apparatus data.

(Item A4)

The size measuring system of any one of items A1 to A3, further having a management server, which is connected to the measuring terminal via a network and stores a database for managing product data indicating a size of each of a plurality of products that can be worn by the user, characterized in that the measuring terminal transmits information on the measured body size of the user to the management server, and the management server references the database, compares the measured body size of the user with sizes of the plurality of products indicated by the product data, extracts product data of a product with a size, which matches with or is within a predetermined value of, the body size of the user, and transmits the product data to the measuring terminal Any combination of the above constituent elements, and a method, device, system, computer program, recording medium storing a computer program, or the like with a replacement of the constituent elements or expression of the invention with one another are also effective as an embodiment of the invention.

Advantageous Effects of Invention

Since the size measuring system of the invention has a size measuring apparatus comprised of a main body substrate, which is composed of a stretchable material and extends to match a body shape of a user when worn by the user, and a plurality of markers that are inelastic placed on the main body substrate; and a measuring terminal for measuring the body size of the user by recognizing the plurality of markers of the size measuring apparatus being worn by the user and computing three-dimensional coordinates of the plurality of markers, the body size of a user can be measured with a high level of precision without a cumbersome measurement process.

The present invention also enables construction of a 3D model reflecting the body size of a user with high precision in order to measure the body size of the user with a high level of precision.

BRIEF DESCRIPTION OF DRAWINGS

FIG. 4B is a diagram showing an example of the configuration of control unit 21 according to the first embodiment of the invention.

FIG. 6 is a diagram showing an example of a data configuration of a marker DB according to the first embodiment of the invention.

FIG. 11 is a diagram showing an example of a data configuration of a product DB according to the first embodiment of the invention.

DESCRIPTION OF EMBODIMENTS

First Embodiment

[1] Summary of the First Embodiment

A size measuring apparatus 10 according to the first embodiment of the invention has an overall shape of clothes or the like, and a marker is provided on the freely stretchable material thereof such as a fiber.

A measuring terminal 20, which is an information processing device comprising a capture function, can measure the body size of users by capturing the size measuring apparatus 10 being worn by the users on their body from a plurality of angles and computing three-dimensional coordinates of a marker of the size measuring apparatus 10 to compute three-dimensional coordinates of a body surface of the users. The measured body size of a user can be the size of the entire body of the user or the size of a part of the body of the user.

This enables users to readily purchase an apparel product that matches their body size.

A provider terminal 30 according to the first embodiment of the invention can readily generate design data for the size measuring apparatus 10 by creating a three-dimensional image of a main body substrate (cloth, fabric, or the like) of the size measuring apparatus 10 on a human body model and setting a placement position of a marker to any position on the main body substrate. Pattern paper data for the size measuring apparatus 10 can also be readily generated by two-dimensionally expressing the design data.

Figure 1:
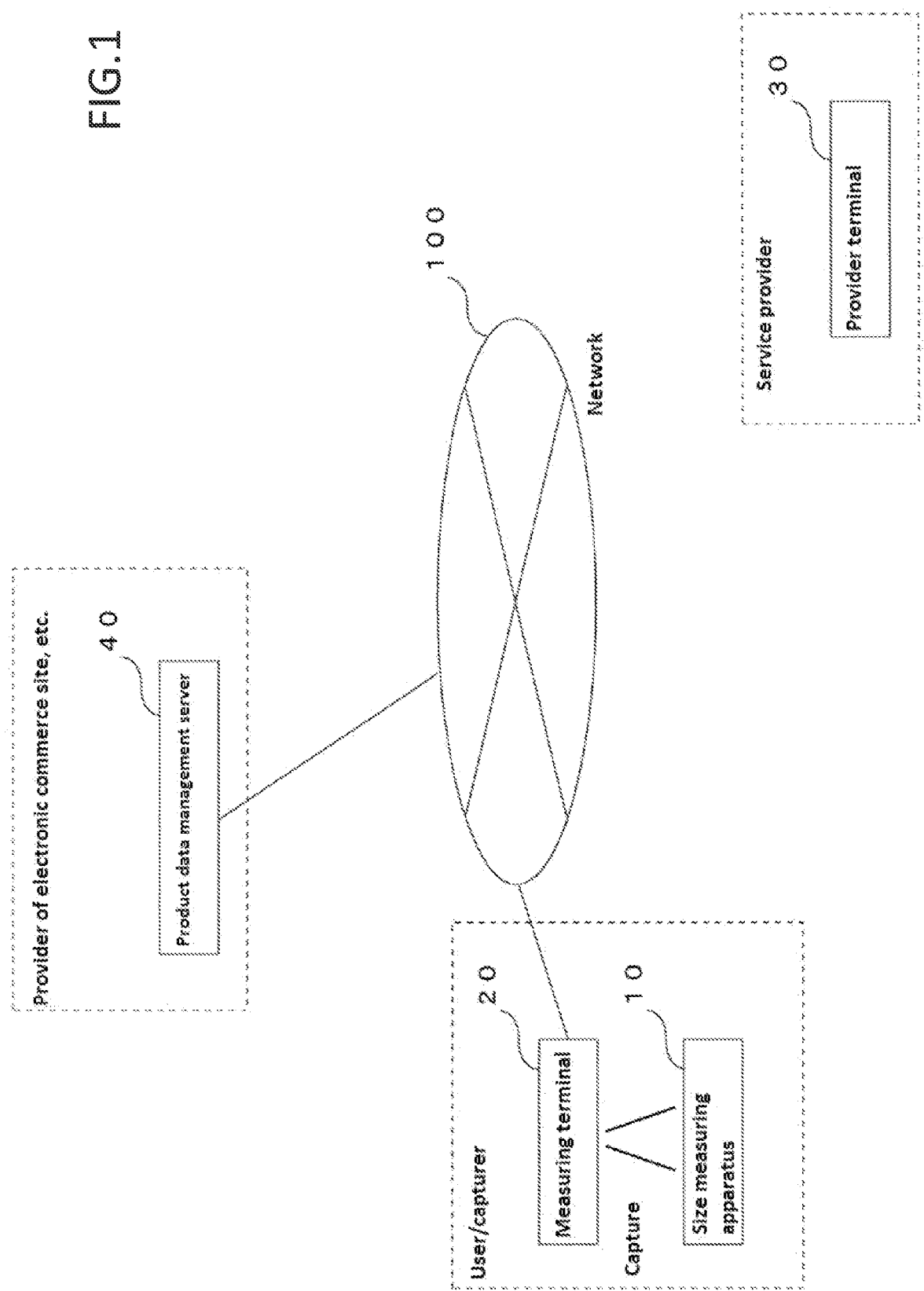
FIG. 1 is a diagram showing the configuration of a size measuring system according to the first embodiment of the invention.

[2] Configuration of the First Embodiment (1) Overall configuration of a size measuring system FIG. 1 is a diagram showing the configuration of a size measuring system according to the first embodiment of the invention.

As shown in the diagram, a size measuring system is comprised of: the size measuring apparatus 10 worn on the body of a user when measuring the size of the body of the user, comprising a plurality of identifiable markers on the surface; the measuring terminal 20 for capturing the user wearing the size measuring apparatus 10 to measure the body size of the user; the provider terminal 30 operated by a service provider providing the size measuring apparatus 10; and a product data management server 40 for storing a database for product data comprising size information of products such as clothes worn by the user.

(2) Configuration of Size Measuring Apparatus 10

Figure 2:
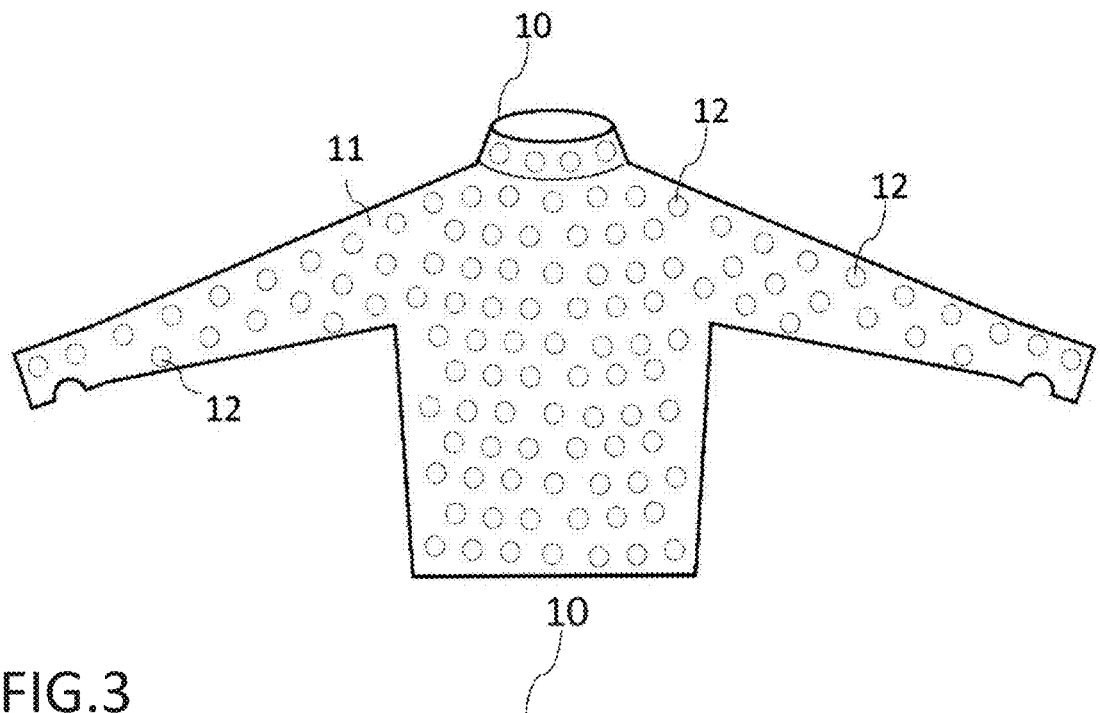
FIG. 2 is a diagram showing the outer appearance of a size measuring apparatus according to the first embodiment of the invention.
Figure 3:
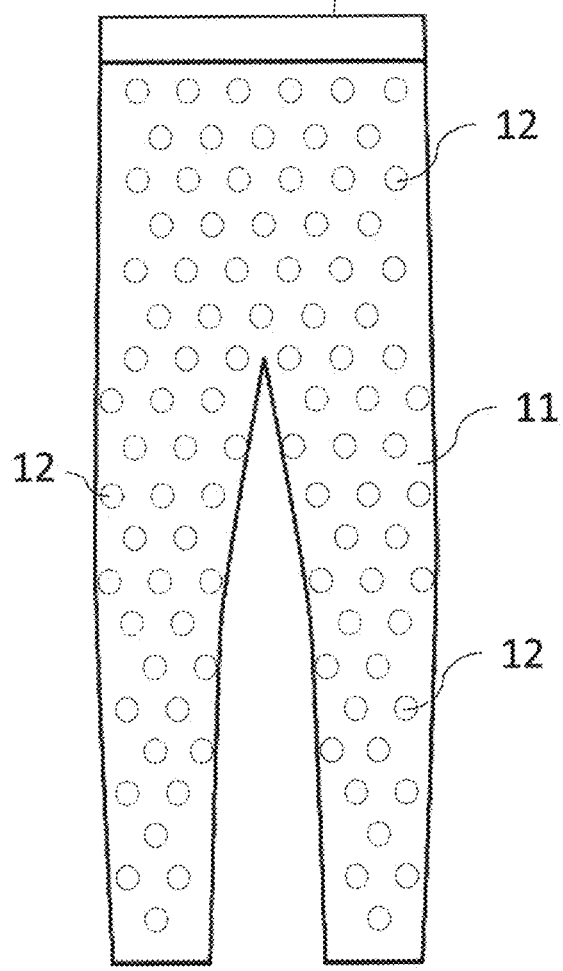
FIG. 3 is a diagram showing the outer appearance of a size measuring apparatus according to the first embodiment of the invention.

FIGS. 2 and 3 are diagrams showing the outer appearance of the size measuring apparatus 10 according to the first embodiment of the invention. FIG. 2 shows a shirt-like size measuring apparatus 10 as an example, and FIG. 3 shows a pant-like size measuring apparatus 10 as an example.

The size measuring apparatus 10 is composed of a material such as a fiber that is freely stretchable as a whole, and is prepared in a form that can be worn on the user's body such as in a form of garment or accessory. The size measuring apparatus 10 can be prepared to constitute a shape of a garment, accessory, or the like, independently or as a combination of a plurality of size measuring apparatuses 10. For example, the size measuring apparatus 10 can be configured to cover the entire body of a user, or to cover a part of the body of a user.

The portion of the size measuring apparatus 10 composed of a freely stretchable material is referred to as a main body substrate 11 hereinafter.

For example, a synthetic fiber or the like woven with both a polyurethane elastic fiber or the like with a stretchable and highly elastic material such as polyester or another fiber (cotton or the like) is used as the stretchable material of the main body substrate 11. The material can be any other material that is generally used in clothes or the like, as long as the stretchability and elasticity thereof are ensured.

For example, the main body substrate 11 of the size measuring apparatus 10 is formed slightly smaller than the body size of a user, so that when equipped (worn) by the user, the substrate extends to match the body shape of the user and fits snugly on the body surface of the user.

As described above, the main body substrate 11 is prepared in a shape that can be equipped (worn) snugly along the body shape of a user such as a garment or accessory form.

For example, the main body substrate 11 can be in a form of a garment such as a shirt, pants, or underwear, or in a form of an accessory such as a hat, sock, hair band, or wrist band.

A plurality of markers 12 are secured onto the main body substrate 11 consisting of a freely stretchable material.

The markers 12 are composed of a material that is inelastic and unmodified upon extension of the main body substrate 11, such as a metal or resin. The markers 12 can be used as a baseline of size, even when the size measuring apparatus 10 is worn by a user, due to inelasticity and unmodifiability of the markers 12.

In one example, the markers 12 can be composed of a stretchable material, just like the main body substrate 11.

The shape, size, surface design (pattern), color tone, material, and the like of the markers 12 are not particularly limited. Various shapes, sizes, surface designs (patterns), color tones, materials, and the like can be applied.

The difference in the shapes, sizes, surface designs (patterns), color tones, materials, and the like in the markers 12 can be used to identify each of the markers 12. Each element for identifying such markers 12 individually is referred to as an "identification element" hereinafter. Each of the markers 12 has an individually different identification element, which renders each of the markers 12 unique within the size measuring apparatus 10.

The measuring terminal 20 identifies each of the markers 12 by reading out an identification element of the markers 12 by an optical readout method or the like. The identification element of the invention can be any element, as long as the element can be recognized during processing of a captured image. Specific examples thereof include a plurality of dots placed in a unique pattern in each marker, color (including cases where a color is applied over the entire surface of a marker, cases where a plurality of colors are applied for each region in the marker to form a unique marker as a whole, and the like), and the like. A preferred identification element in the present invention can be a plurality of dots placed in a unique pattern in each marker. A more preferred identification element in the present invention can be a plurality of dots placed in a unique pattern in each marker, the plurality dots being formed as pores within the marker prepared with an inelastic material. Dots formed as pores within a marker can have any size to the extent that inelasticity of the marker is not impaired. For example, the dots can have a maximum dimension of about 5% to 15% of the maximum dimension of the marker. For example, if the markers 12 are circular with a diameter of about 20 mm, the dots can be circular with a diameter of about 1 mm to about 3 mm. A marker having such a plurality of dots as an identification element is readily manufactured at a low cost because the markers can be manufactured with a monochromatic inelastic material. Furthermore, the markers 12 can still be used as a baseline of size by minimizing dots (pores within a marker), without impairing the inelasticity of the markers 12. Since the unique pattern of dots can be expanded infinitely by changing the number and position of dots, the number of markers 12 on the size measuring apparatus 10 can be readily increased or decreased. This enables markers to be readily manufactured at a low cost even for a size measuring apparatus 10 with a greater size or a smaller size.

When a user wears the size measuring apparatus 10, the main body substrate 11 extends along the body shape of the user, so that the relative position between each of the markers 12 placed on the main body substrate 11 changes.

The measuring terminal 20 measures the body size of a user by measuring the amount of such a change.

For example, when a user wears the pant-like size measuring apparatus 10 shown in FIG. 3 on the lower half of their body in the same manner as wearing pants, the size measuring apparatus 10 extends to match the size and shape of the lower half of the body of the user, and measures the size and shape.

For example, the size measuring apparatus 10 extends in the direction of length of a leg to match the body shape of a user, and extends in the circumferential direction around the waist, hip, and leg to match the shape of the waist or hip, thickness of the leg, or the like by wearing the size measuring apparatus so that the waist portion of the size measuring apparatus 10 marches the location of the waist of the user and positioning the sleeve portion of the size measuring apparatus 10 slightly above the ankle of the user.

When the user detaches the size measuring apparatus 10 from the lower half of the body in the same manner as taking off tights, the size measuring apparatus 10 reverts back to the original size and shape.

(3) Configuration of Measuring Terminal 20

The measuring terminal 20 is an information processing device that is operated when measuring the body size of a user.

For example, the measuring terminal 20 is a mobile information processing device such as a smartphone, tablet terminal, wearable terminal, mobile phone, PDA, PHS, or PC.

In one example, the measuring terminal 20 captures and recognizes the plurality of markers 12 of the size measuring apparatus 10 worn by a user and computes the three-dimensional coordinates of the recognized plurality of markers 12 to measure the body size of the user based on the three-dimensional coordinates of the markers 12.

In another example, the measuring terminal 20 captures a user wearing the size measuring apparatus 10 and constructs a 3D model of the user by using the captured image to measure the body size of the user based on the constructed 3D model.

The measuring terminal 20 can also communicate with the product data management server 40 via a network by using a communication function and search for a product such as clothes matching the body size based on the measured body size of the user.

Figure 4A:
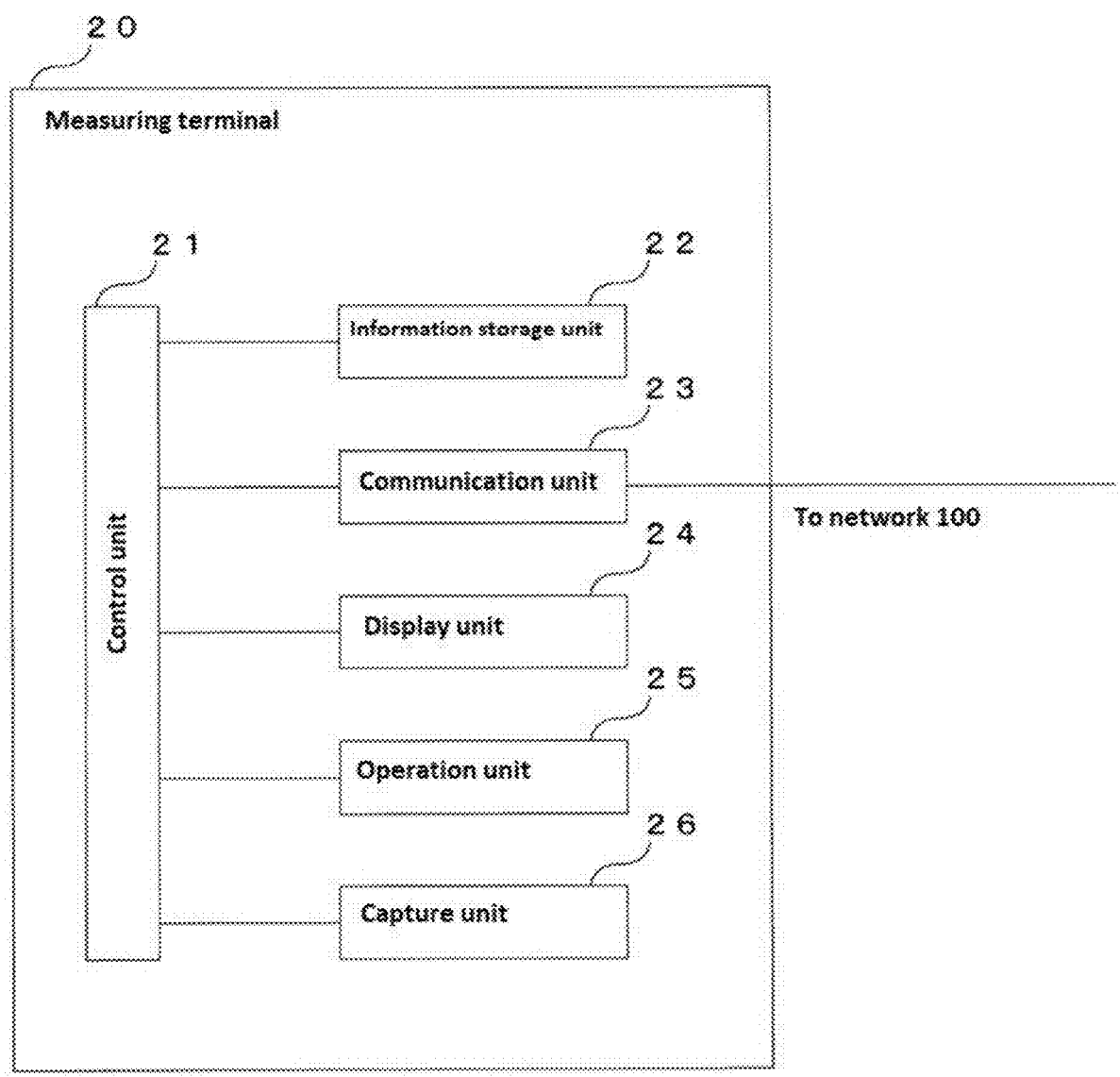
FIG. 4A is a diagram showing the configuration of a measuring terminal according to the first embodiment of the invention.

FIG. 4A is a diagram showing the configuration of the measuring terminal 20 according to the first embodiment of the invention.

As shown in the diagram, the measuring terminal 20 is comprised of: a control unit 21 for controlling the entire measuring terminal 20, composed of a CPU or the like; an information storage unit 22 for storing various pieces of information; a communication unit 23 for communicating with the product data management server 40 via a network 100; a display unit 24 for displaying various pieces of information; an operation unit 25 used for inputting information, comprising various keys and the like; and a capture unit 26 for inputting an image, comprising a camera or the like.

The display unit 24 and the operation unit 25 can also be integrally constructed as a touch panel.

Each of the units 21 to 26 is connected to an internal bus. Various pieces of information and the like are inputted and outputted via such a bus. Various processes are executed under the control of the control unit 21.

The control unit 21 is a processing unit responsible for controlling the entire measuring terminal 20, and is composed of an electric circuit such as a CPU (Central Processing Unit) or an integrated circuit such an FPGA (Field-Programmable Gate Array).

The control unit 21 executes readout of information from the information storage unit 22 as well as write-in of information into the information storage unit 22.

The information storage unit 22 is a device for storing information, such as a hard disk, memory, or a semiconductor element.

Figure 16A:
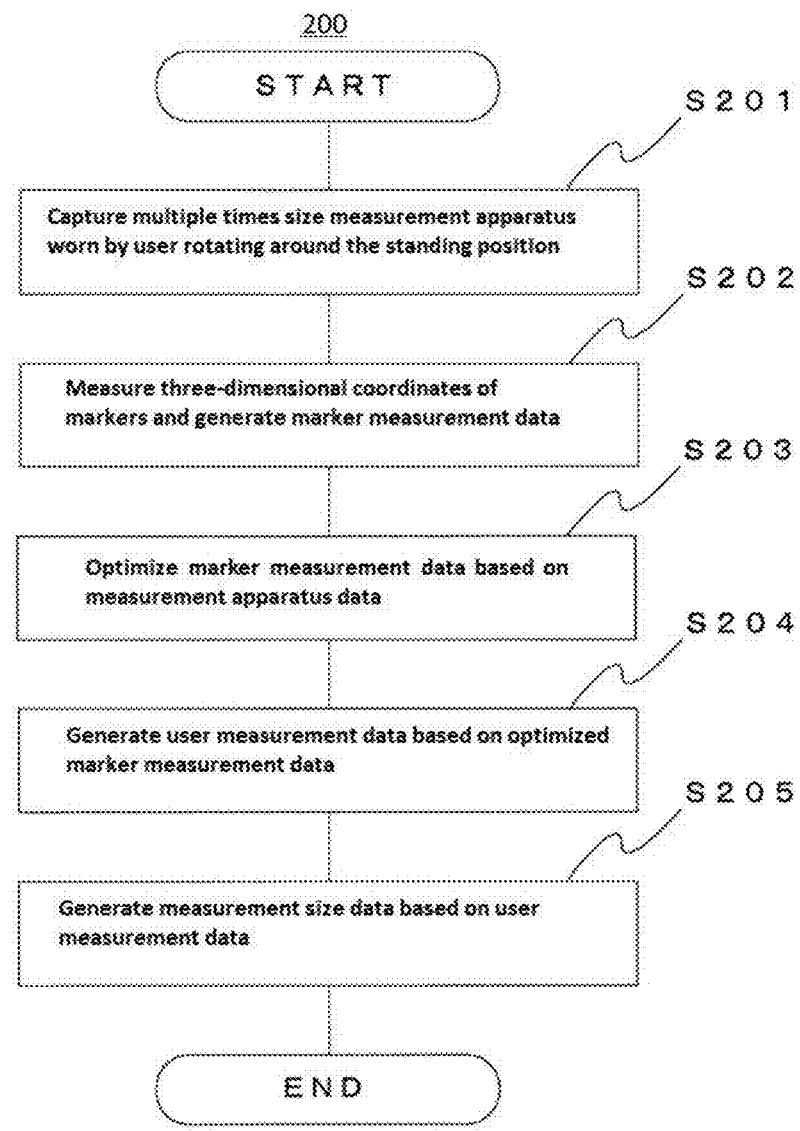
FIG. 16A is a flowchart showing an example of flow 200 of the operation of measuring the body size of a user according to the first embodiment of the invention.
Figure 16B:
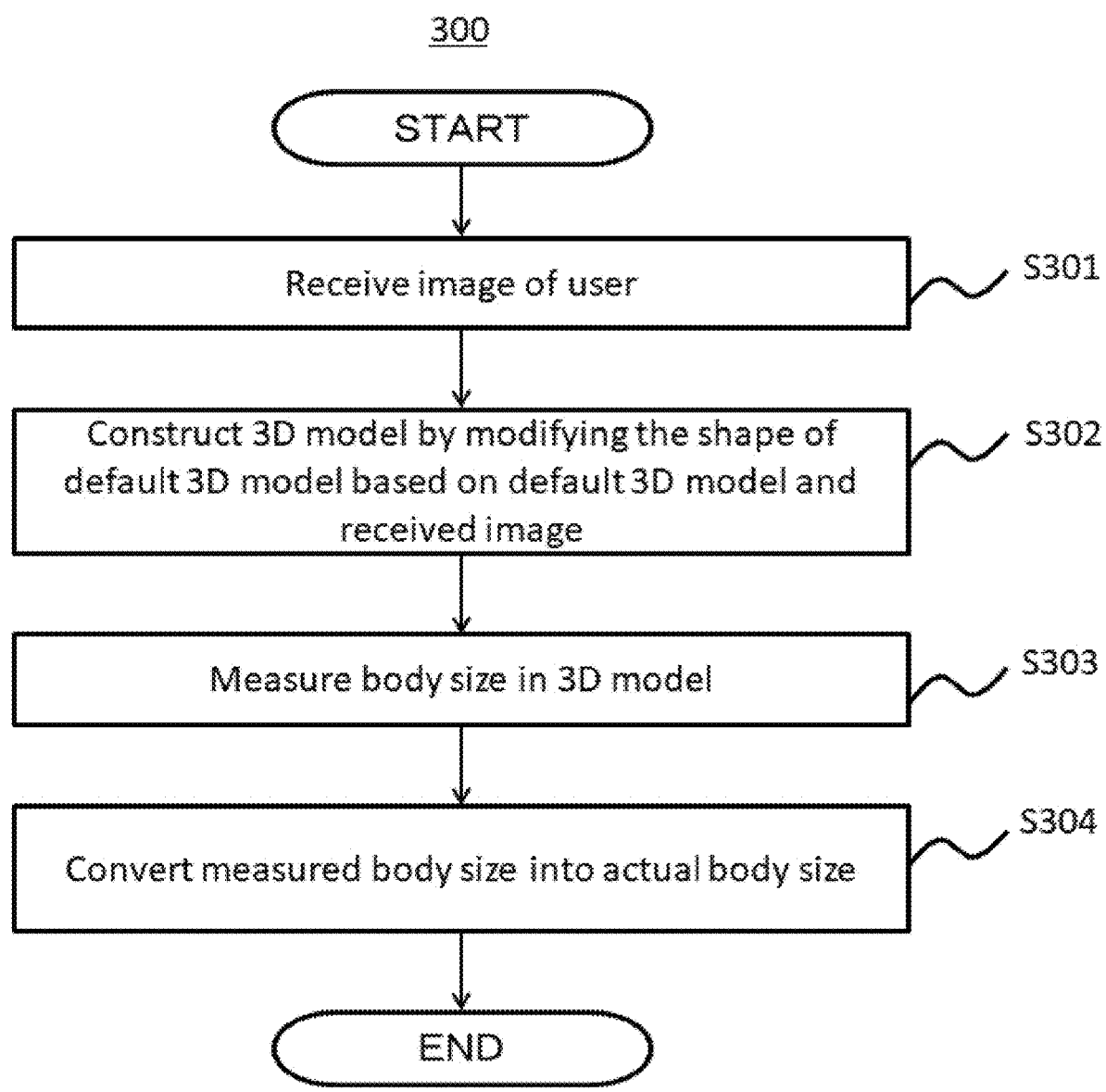
FIG. 16B is a flowchart showing an example of processing 300 for measuring the body size in another example of the flow 200 of an operation of measuring the body size of a user according to the first embodiment of the invention.
Figure 16C:
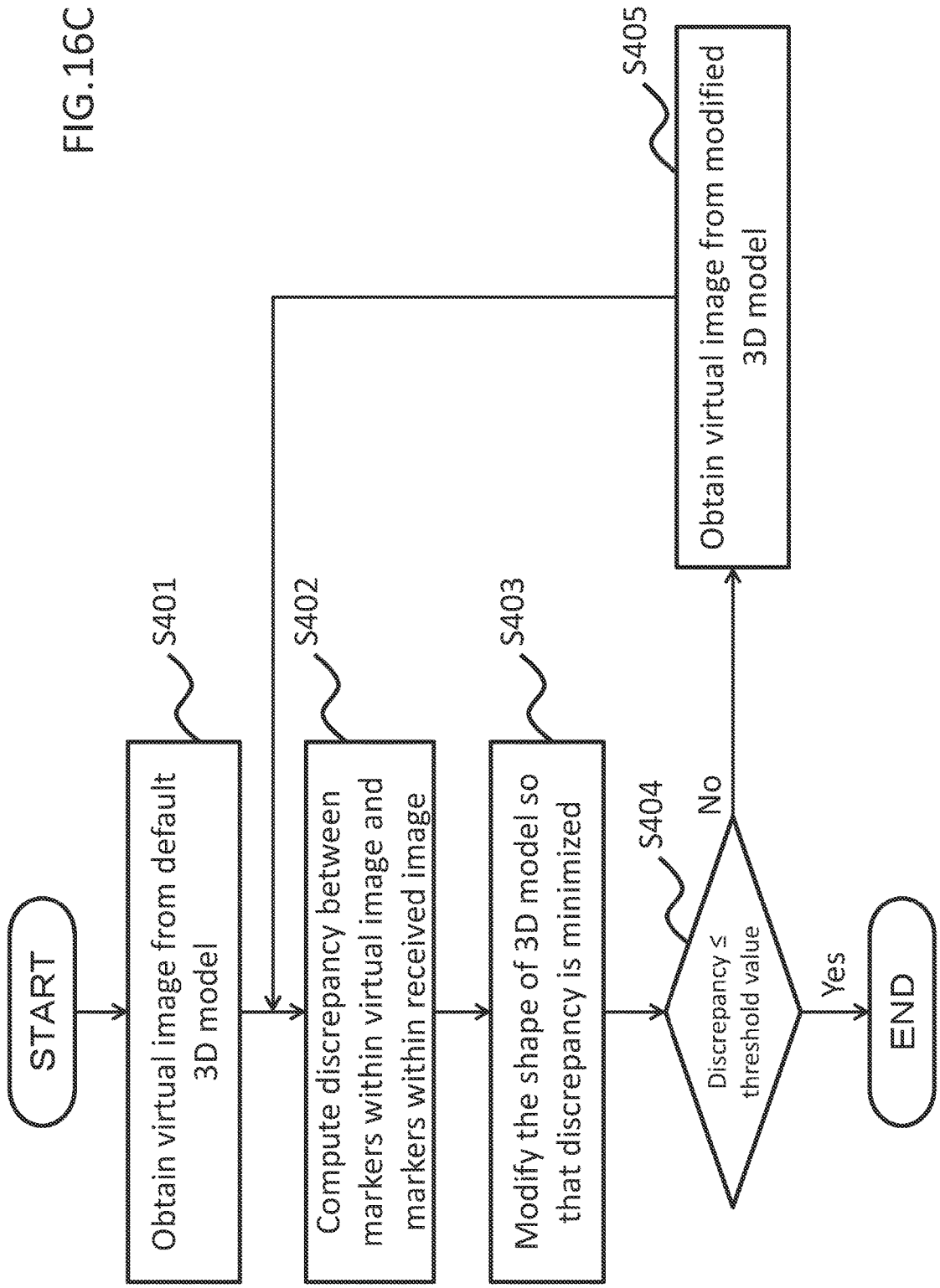
FIG. 16C is a flowchart showing an example of processing 400 for 3D model constructing means 211 to construct a 3D model in step S302 according to the first embodiment of the invention.

The information storage unit 22 has a region for storing a program executed by the control unit 21 (e.g., program materializing a part of the processing shown in FIG. 16A or processing shown in FIG. 16B or 16C), a working region (RAM or the like) that is temporarily used when the control unit 21 executes a process, or the like.

The control unit 21 reads out a program stored in the information storage unit 22 (three-dimensional reconstruction algorithm, optimization algorithm, bundle adjustment algorithm, or the like) and deploys the program in the working region to execute various processes.

The measuring apparatus data indicating the placement positions of the markers 12 on the main body substrate 11 of the size measuring apparatus 10 is stored in the information storage unit 22 in advance.

The measuring apparatus data is generated by the provider terminal 30 as described below.

For example, the information storage unit 22 can store data for constructing a 3D model of a user, generated by the 3D model constructing means 211 described below. Data for constructing a 3D model of a user can be data for expressing a 3D model that is known in the art. Data can be, for example, polygon data representing each vertex of a 3D model.

The information storage unit 22 can further store data for constructing a default 3D model. A default 3D model is a base 3D model used for constructing a 3D model of a user. For example, as the base default 3D model, a different model can be selected for each target user, or the model can be constant for each user. If the base default 3D model is constant for each user, a default 3D model can be constructed, for example, as a model having a height of about 170 cm and a body shape obtained from averaging the average body shape of males and average body shape of females. Since the height of about 170 cm is the average height of Japanese, such a default 3D model is readily utilized for constructing 3D models of users with various body shapes.

A default 3D model comprises a plurality of markers corresponding to the plurality of markers 12 of the size measuring apparatus 10. The plurality of markers of the default 3D model are unique within the default 3D model, in the same manner as the plurality of markers 12. The plurality of markers of the default 3D model are placed at the same positions as the positions where the plurality of markers 12 are located when the size measuring apparatus 10 is worn by a person with the height and body shape of the default 3D model.

Data for constructing a default 3D model can be data for expressing a 3D model that is known in the art. Data can be, for example, polygon data representing each vertex of a 3D model.

The communication unit 23 is an interface for controlling the communication with the product data management server 40 via the network 100, having a LAN adapter or the like.

The communication unit 23 can comprise a wireless transceiver and be connected to a LAN, Internet, or the like via wireless communication, or can be connected via a wire such as a cable.

The display unit 24 is a display device such as a display or a lamp.

The control unit 21 reads out an image from the information storage unit 22, and executes image output processing to generate screen information. The control unit also executes image output processing on image information received by the communication unit 23 from the product data management server 40 to generate screen information.

The control unit 21 outputs the generated image information to the display unit 24.

The display unit 24 displays the inputted image information on a screen such as a display.

The control unit 21 can also output a control signal to the display unit 24 and light up a lamp of the display unit 24.

The operation unit 25 comprises an information input device composed of, for example, various keys or the like. The information input device provides a pointing device in cooperation with the display unit 24. The operation unit 25 accepts various operations from a user or the like and outputs a signal indicating the specific operation to the control unit 21.

When the signal indicating the specific operation is inputted, the control unit 21 outputs, on the display unit 24, a control signaling instructing to display a screen on the display unit 24 in accordance with the specific operation in accordance with the content of the signal.

When the control signal is inputted, the display unit 24 displays a screen in accordance with the control signal.

The display unit 24 and the operation unit 25 can also be integrally constructed as a touch panel.

The capture unit 26 comprises a camera or the like, and captures the size measuring apparatus 10 worn by a user and inputs an image of the size measuring apparatus 10 into the measuring terminal 20. An image can be a still image or a video herein. If the image captured by the capture unit 26 is a video, the measuring terminal 20 can have a configuration for extracting a still image (planar image) from a video. For example, the measuring terminal 20 has a known software for extracting a still image from a video, and a still image can be extracted from a video captured by the capture unit 26 with the software.

Since the plurality of markers 12 on the size measuring apparatus 10 are unique within the measuring apparatus 10, a plurality of markers within a planar image are also unique within the planar image.

The capture unit 26 inputs the inputted planar image data of the size measuring apparatus 10 into the control unit 21.

In one example, once the planar image data of the size measuring apparatus 10 is inputted, the control unit 21 recognizes an image of the plurality of markers 12 placed on the size measuring apparatus 10 from the inputted planar image data, and recognizes which marker 12 is at which position of a planar space indicated in the planar image data.

The control unit 21 also recognizes the contour of the size measuring apparatus 10 (boundary from the background) in addition to an image of the markers 12 in the planar image data.

The image recognition methodology used by the control unit 21 can be, for example, conventional, common optical readout methodology or methodologies using other image recognition methods.

The control unit 21 computes the three-dimensional coordinates of each marker 12 based on recognition of each marker 12 and the planar coordinates within a planar image to generate marker measurement data, which is a set of three-dimensional coordinates of the plurality of markers 12.

For example, the control unit 21 computes the three-dimensional coordinates of the markers 12 and pose information (three-dimensional coordinates, and angles in each capture direction of yaw, pitch, and roll) of the capturing measuring terminal 20 by using the principle of triangulation, based on the planar coordinates of the markers 12 recognized in common within a plurality of planar images of image data or the like.

The control unit 21 computes user measurement data representing three-dimensional coordinates of a virtual group of points positioned on the body surface of a user based on the computed marker measurement data.

In addition, the control unit 21 computes measurement size data representing the size of a given body part of a user based on the user measurement data.

In another example, once an image capturing a user wearing the size measuring apparatus 10 is received from the capture unit 26, the control unit 21 constructs a 3D model of the user based on the received image.

FIG. 4B is a diagram showing an example of the configuration of the control unit 21 according to this example.

The control unit 21 can comprise at least 3D model constructing means 211.

The 3D model constructing means 211 is configured to receive an image captured using the capture unit 26 and construct a 3D model based on the received image. The 3D model constructing means 211 constructs a 3D model of a user, for example, by modifying the shape of a default 3D model based on the default 3D model and received image.

In one example, the 3D model constructing means 211 recognizes planar coordinates of the plurality of markers within a plurality of received images, and computes three-dimensional coordinates of the plurality of markers 12 using the principle of triangulation. The shape of the default 3D model is then modified so that three-dimensional coordinates of a plurality of markers on the default 3D model would be the computed three-dimensional coordinates of the respective corresponding plurality of markers 12. A 3D model constructed by modifying the shape of the default 3D model so that three-dimensional coordinates of all of the plurality of markers on the default 3D model would be the computed three-dimensional coordinates of the respective corresponding plurality of markers 12 would be the 3D model of the user. In this regard, it is not necessary that the three-dimensional coordinates of the plurality of markers on the default 3D model are complete matches with the three-dimensional coordinates of the corresponding plurality of markers 12. A specific error (e.g., ±5%) can be tolerated.

In another example, the 3D model constructing means 211 obtains a two-dimensional virtual image from a default 3D model, and modifies the shape of the default 3D model based on the virtual image obtained from the default 3D model and a received image. The virtual image is an image virtually capturing the default 3D model from a plurality of directions. In this regard, the received image is preferably an image captured from a direction that is the same or close to the direction from which the virtual image is captured. This is because comparison of the virtual image and the received image can be facilitated in subsequent processing. For example, when a virtual image is an image virtually capturing a default 3D model from 12 directions including the direction of 1 o'clock, 2 o'clock . . . 12 o'clock with respect to the default 3D model, it is preferable to capture a user so that the received image also captures the user from 12 directions including the direction of 1 o'clock, 2 o'clock . . . 12 o'clock with respect to the user. Furthermore, the camera position from which the received image is captured is preferably the same or close to the camera position from which a virtual image is virtually captured. This is because comparison of the virtual image and the received image can be facilitated in subsequent processing. For example, if a virtual image is virtually captured from a camera position with a distance of about 2 m from a subject and a camera height of about 70 cm, a user is preferably captured so that the received image is also captured from a virtual camera position with a distance of about 2 m from a subject and a camera height of about 70 cm. Since a plurality of markers of a default 3D model are unique within the default 3D model, the markers are also unique within a virtual image.

For example, the 3D model constructing means 211 computes a discrepancy between a plurality of markers within a virtual image obtained from a default 3D model and corresponding plurality of markers within a received image, and performs a default 3D model based modification such that the computed discrepancy is minimized. The plurality of markers within the virtual image are unique within the virtual image, and the plurality of markers within the received image are also unique. Thus, the plurality of markers within the virtual image can be associated with the corresponding plurality of markers within the received image. For example, the 3D model constructing means 211 determines the positions of the plurality of markers within the virtual image that minimize the computed discrepancy, and modifies the shape of the base default 3D model so that the plurality of markers are at the determined positions. A 3D model constructed based on the default 3D model to minimize the discrepancy between all of the plurality of markers within the virtual image obtained from the default 3D model and all of the corresponding plurality of markers within the received image would be the 3D model of a user. In this regard, it is not necessary that the discrepancy is completely 0. The discrepancy can be a specific minimum value (e.g., fixed value, or a value less than or equal to a predetermined threshold value). The 3D model constructing means 211 can derive a modification that minimizes the computed discrepancy by any approach. For example, a modification that minimizes the computed discrepancy can be derived using the least square method.

The shape of a default 3D model can be modified by the 3D model constructing means 211 within a virtual three-dimensional space. A virtual three-dimensional space is a space that is created by expanding or contracting an actual three-dimensional space at a predetermined scale. With modification of shape within a virtual three-dimensional space, the scale is unchanged before and after the modification, so that computation of the size within an actual three-dimensional space using a 3D model after the modification of shape and the scale is facilitated.

For example, the scale between a virtual three-dimensional space and an actual three-dimensional space is predetermined by the ratio of the size of a plurality of markers on a default 3D model within the virtual three-dimensional space to the size of the plurality of markers on the size measuring apparatus 10 within the actual three-dimensional space. For example, if the size of a plurality of markers on a default 3D model within a virtual three-dimensional space is X, and the size of the plurality of markers 12 on the size measuring apparatus 10 within an actual three-dimensional space is Y, the scale is determined as X:Y.

The control unit 21 can further comprise measuring means 212 and converting means 213.

The measuring means 212 is configured to measure the body size in a 3D model of a user constructed by the 3D model constructing means 211. The size measured by the measuring means 212 is the size within a virtual three-dimensional space. The measuring means 212 can measure the body size of a 3D model using a known methodology. For example, the measuring means 212 can determine the size of a site targeted for measurement by slicing a 3D model into a two dimensional cross-section and measuring the dimension of the site targeted for measurement in the two-dimensional cross-section. For example, the hip circumference can be measured by measuring the circumferential length, in a two-dimensional cross-section, of the narrowest portion of the hip. For example, the shoulder width can be measured by measuring the length between both shoulders in a two-dimensional cross-section passing through both shoulders.

The converting means 213 is configured to convert the body size measured by the measuring means 212 into the actual body size. As described above, the size measured by the measuring means 212 is the size within a virtual three-dimensional space, so that such a size needs to be converted into the size within the actual three-dimensional space by the converting means 212. For example, the converting means 213 converts the body size within a virtual three-dimensional space into the size within an actual three-dimensional space using the scale between the virtual three-dimensional space and the actual three-dimensional space.

The control unit 21 computes measurement size data representing the size of a given body part of a user based on the size within the actual three-dimensional space outputted by the converting means 213.

The control unit 21 can output the computed measurement size data to the display unit 24 and display the data on the display unit 24.

For example, the control unit 21 can output a three-dimensional image of a 3D model of a user constructed by the 3D model constructing means 211 to the display unit 24, and display the image on the display unit 24. In this regard, the display unit 24 can be configured to display a value of computed measurement size data on or in the vicinity of the corresponding part of the three-dimensional image of the 3D model.

This enables a user to check and reference the displayed measurement size data (e.g., height, bust, waist, or hip size, or the like) when purchasing an apparel product (clothes, accessory, or the like) that matches the user's own body size. For example, among the measurement size data, a value indicating the size of the neck circumference and a value indicating the shoulder width plus sleeve length can be displayed on the display unit 24 to allow a user to use this as a reference when selecting a dress shirt. For example, a value indicating the sleeve length, a value indicating the shoulder width, a value indicating the chest circumference, and a value indicating the dress length can be displayed on the display unit 24 to allow a user to use these as a reference when selecting a jacket. For example, among measurement size data, a value indicating the waist size, a value indicating the hip size, a value indicating the size of the circumference of the thigh, a value indicating the size of rise, and a value indicating the size of inseam can be displayed on the display unit 24 to allow a user to use these as a reference when selecting a pair of pants.

The measuring terminal 20 can receive screen information, e.g., a web page, from the product data management server 40 that functions as a web server, and display the information.

The measuring terminal 20 has a function of generating and transmitting an HTTP (Hypertext Transfer Protocol) request in response to a user request and a function for interpreting the HTTP response (an example of a response) and presenting the response to a user by the control unit 21.

For example, the information storage unit 22 stores a web browser as an example.

The control unit 21 interprets an HTTP response and presents the HTTP response to a user by generating image data or audio data, displaying the data on the display unit 24, or outputting an audio from a speaker of the measuring terminal 20.

When the communication unit 23 transmits measurement size data indicating the body size of a user to the product data management server 40, the product data management server 40 extracts data for a product (product data) matching the body size indicated by the measurement size data from a database (product DB 421) and transmits product search result information (web page or the like), which is screen information including the product data, to the measuring terminal 20.

The communication unit 23 of the measuring unit 20 displays the product search result information on the display unit 24 when the information is received from the product data management server 40.

Users can readily find information on a product such as a garment that matches their own body size by looking at the displayed product search result information. This facilitates the selection of a product to be purchased.

If product search result information is on a web page of an electronic commerce site, a user can directly purchase the product on the electronic commerce site by operating the operation unit 25 and pointing out (clicking a button or the like) a given area of the product search result information displayed on the display unit 24.

Figure 5:
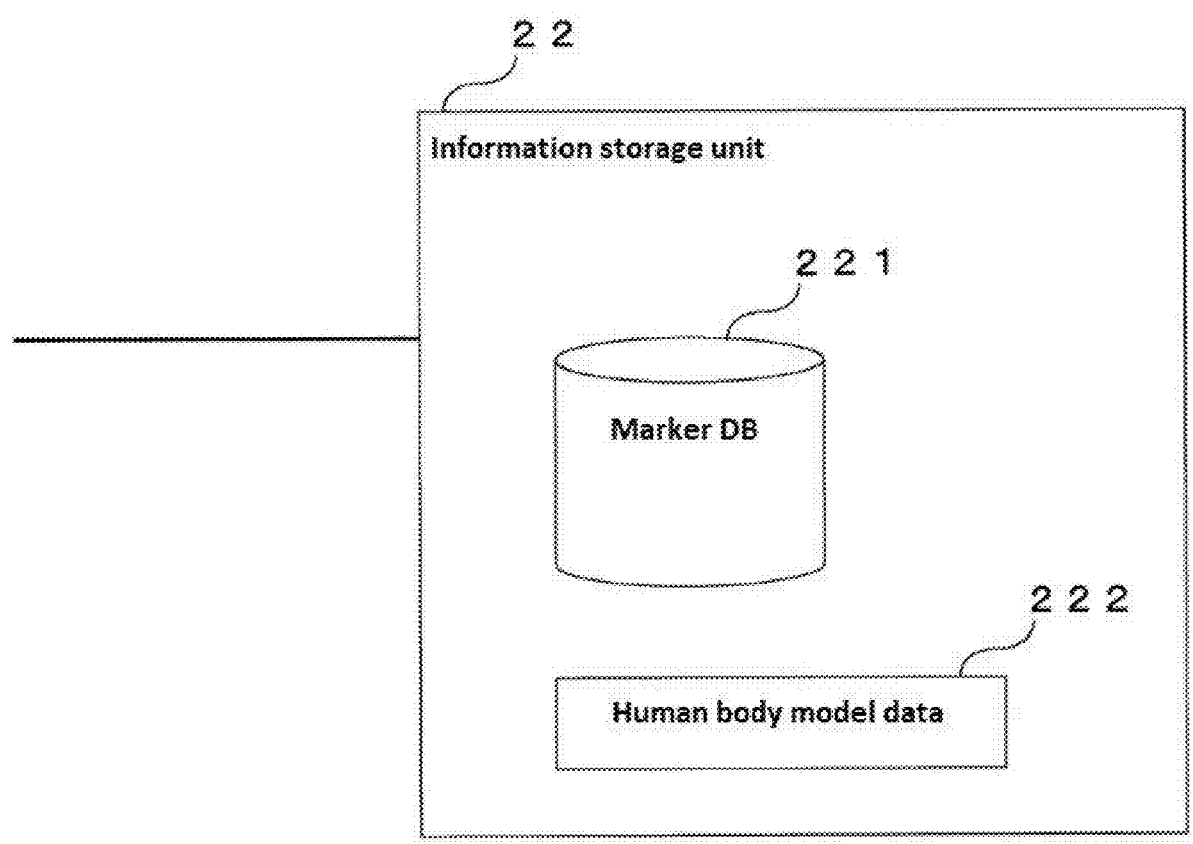
FIG. 5 is a diagram showing data or the like stored by an information storage unit of a measuring terminal according to the first embodiment of the invention.

FIG. 5 is a diagram showing data or the like stored by the information storage unit 22 of the measuring terminal 20 according to the first embodiment of the invention.

As shown in the diagram, the information storage unit stores a marker DB 221 for managing identification elements such as the shape of each marker 12 and human body model data 222 indicating a body part computed as measurement size data.

FIG. 6 is a diagram showing an example of a data configuration of the marker DB 221 according to the first embodiment of the invention.

In the example shown in the diagram, the marker DB 221 manages text data or image data indicating the shape, size, surface design (pattern), color tone, material, or the like of the markers 12 for each marker.

For example, the control unit 21 of the measuring terminal 20 recognizes and identifies the image of the markers 12 within the captured planar image by referring to the marker DB 221.

The human body model data 222 is data for a human body model representing a common human body shape, and is aggregate data of three-dimensional coordinates of a virtual group of points located on the body surface of the human body model. The human body model data 222 can comprise data for constructing a 3D model of a user and data for constructing a default 3D model.

The human body model data 222 also comprises information indicating three-dimensional coordinates of a group of points located on a line indicating the length of a body part computed as measurement size data.

The control unit 21 of the measuring terminal 20 references the human body model data 222, recognizes the position of a body part computed as measurement size data, identifies the position of the body part computed as the measurement size data among the body of a user indicated in user measurement data, and extracts the three-dimensional coordinates of a group of points at the identified position to compute the body size of the user.

(4) Configuration of Provider Terminal 30

The provider terminal 30 is an information processing device operated by a service provider providing the size measuring apparatus 10 to users.

For example, the provider terminal 30 is an information processing device such as a PC, tablet terminal, smartphone, wearable terminal, mobile phone, PDA, or PHS.

The provider terminal 30 generates measuring apparatus data by setting the placement positions of the markers 12 on the main body substrate 11 of the size measuring apparatus 10, and generates pattern paper data for the size measuring apparatus 10 with set placement positions of the markers 12.

The provider terminal 30 generates pattern paper data for the size measuring apparatus 10 based on measuring apparatus data comprising three-dimensional coordinates of a virtual group of points indicating the surface of the size measuring apparatus 10. The generation method thereof can utilize a conventional, so-called apparel CAD or the like to process conversion from three-dimensional data, i.e., measuring apparatus data, to two-dimensional data, i.e., pattern paper data, to generate the pattern paper data. The generation method is not particularly limited.

Generated pattern paper data is inputted into a device (not shown) for manufacturing the size measuring apparatus 10, which is an information processing device comprising a cutting/sewing function or the like.

The input method is not particularly limited. For example, the data is inputted into the device for manufacturing the size measuring apparatus 10 using a communication function, such as near field communication, of the provider terminal 30. The device for manufacturing the size measuring apparatus 10 cuts and sews fibrous cloth or the like that is the material of the main body substrate 11 based on the inputted pattern paper data to manufacture the main body substrate 11, and secures the markers 12 at predetermined positions on the main body substrate 11 designated in the pattern paper data. Such a securing method can be a conventional and common method such as securing with resin or adhesive, or securing by sewing.

Normal pattern paper can be created by inputting the pattern paper data into a printer or the like and printing and cutting based on the pattern paper data.

Figure 7:
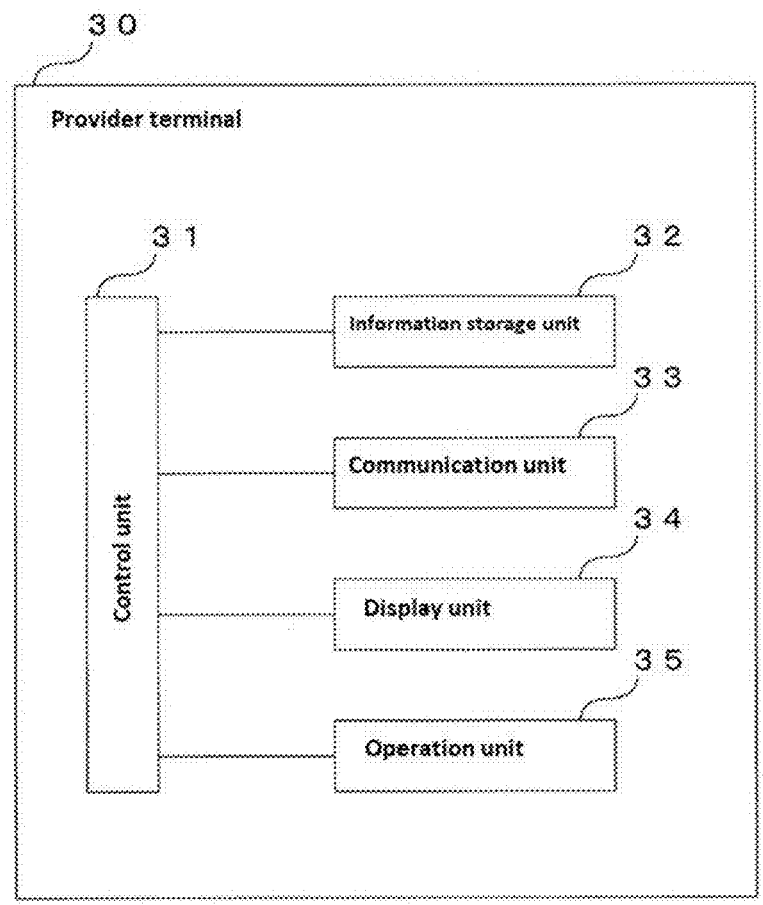
FIG. 7 is a diagram showing the configuration of a provider terminal according to the first embodiment of the invention.

FIG. 7 is a diagram showing a configuration of the provider terminal 30 according to the first embodiment of the invention.

As shown in the diagram, the provider terminal 30 is comprised of a control unit 31 for controlling the entire provider terminal 30 composed of a CPU or the like, an information storage unit 32 for storing various pieces of information, a communication unit 33 for performing communication, a display unit 34 for displaying various pieces of information, an operation unit 35 used for inputting information, comprising various keys and the like, and a capture unit 36 for inputting an image, comprising a camera or the like.

The display unit 34 and the operation unit 35 can also be integrally constructed as a touch panel.

Each of the units 31 to 35 is connected to an internal bus. Various pieces of information and the like are inputted and outputted via such a bus. Various processes are executed under the control of the control unit 31.

The control unit 31 is a processing unit responsible for controlling the entire provider terminal 30, composed of an electric circuit such as a CPU (Central Processing Unit) or an integrated circuit such an FPGA (Field-Programmable Gate Array).

The control unit 31 executes readout of information from the information storage unit 32 as well as write-in of information into the information storage unit 32.

The information storage unit 32 is a device for storing information, such as a hard disk, memory, or a semiconductor element.

The information storage unit 32 has a region for storing a program executed by the control unit 31 or a working region (RAM or the like) that is temporarily used when the control unit 31 executes a process.

The control unit 31 reads out a program stored in the information storage unit 32 and deploys the program in the working region to execute various processes.

The communication unit 33 is an interface for controlling communication, having a LAN adapter or the like.

The communication unit 33 can comprise a wireless transceiver and be connected to LAN, Internet, or the like via wireless communication, or can be connected via a wire such as a cable.

The display unit 34 is a display device such as a display or a lamp.

The control unit 31 reads out an image from the information storage unit 32, and executes image output processing to generate screen information. The control unit also executes image output processing on image information received by the communication unit 33 from the product data management server 40 to generate screen information.

The control unit 31 outputs the generated image information to the display unit 34.

The display unit 34 displays the inputted image information on a screen such as a display.

The control unit 31 can also output a control signal to the display unit 34 and light up a lamp of the display unit 34.

The operation unit 35 comprises an information input device composed of, for example, various keys or the like. The information input device provides a pointing device in cooperation with the display unit 34. The operation unit 35 accepts various operations by a user or the like and outputs a signal indicating a specific operation to the control unit 31 or the like.

When the signal indicating the specific operation is inputted, the control unit 31 outputs, on the display unit 34, a control signaling instructing to display a screen on the display unit 34 in accordance with the specific operation in accordance with the content of the signal.

When the control signal is inputted, the display unit 34 displays a screen in accordance with the control signal.

The display unit 34 and the operation unit 35 can also be integrally constructed as a touch panel.

Figure 8:
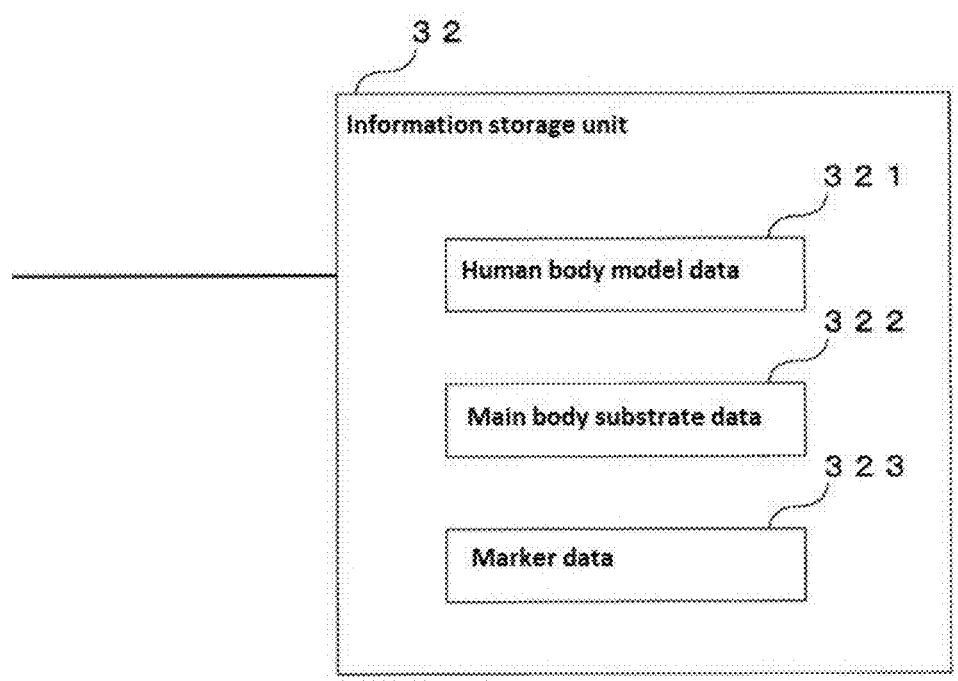
FIG. 8 is a diagram showing data or the like stored by an information storage unit of a provider terminal according to the first embodiment of the invention.

FIG. 8 is a diagram showing data or the like stored by the information storage unit 32 of the provider terminal 30 according to the first embodiment of the invention.

As shown in the diagram, the information storage unit stores human body model data 321, which is data of a human body model representing a typical shape of a human body and is aggregate data of three-dimensional coordinates of a virtual group of points positioned on the body surface of the human body model, main body substrate data 322, which is aggregate data of three-dimensional coordinates of a virtual group of points indicating the shape of the main body substrate 11, and marker data 323, which is aggregate data of three-dimensional coordinates of a virtual group of points indicating the shape of the markers 12 or the like.

A plurality of patterns of human body models can be prepared in advance by sex, age, race, or the like. In such a case, the information storage unit 32 stores human body model data corresponding to the plurality of patterns.

The control unit 31 of the provider terminal 30 can generate, and display on the display unit 34, a three-dimensional image of a human body model, the main body substrate 11, and the markers 12 based on three-dimensional coordinates of a group of points constituting the human body model data 321, main body substrate data 322, and marker data 323, respectively.

This is materialized by a common and conventional technique of processing for displaying three-dimensional images using point group data.

The control unit 31 can apply image processing such as expansion/contraction or rotation to a three-dimensional image of the main body substrate 11 to match a three-dimensional image of a human body model and synthesize both three-dimensional images to generate a hypothetical three-dimensional image of the human body model wearing the main body substrate 11.

The control unit 31 selects the type of marker 12, rotates the image of the main body substrate 11 after the synthesis, and places the selected markers 12 on the three-dimensional image of the main body substrate 11 for synthesis to generate measuring apparatus data.

Measuring apparatus data includes three-dimensional coordinate data for groups of points constituting the main body substrate 11 and markers 12 and three-dimensional coordinate data for placement positions of the markers 12.

(5) Configuration of the Product Data Management Server 40

The product data management server 40 is a server for managing product data for apparel products and generating and providing a web page for selling the apparel products.

The product data management server 40 is managed, for example, by an electronic commerce site operator or the like engaging in the business of selling apparel products on the Internet.

Figure 9:
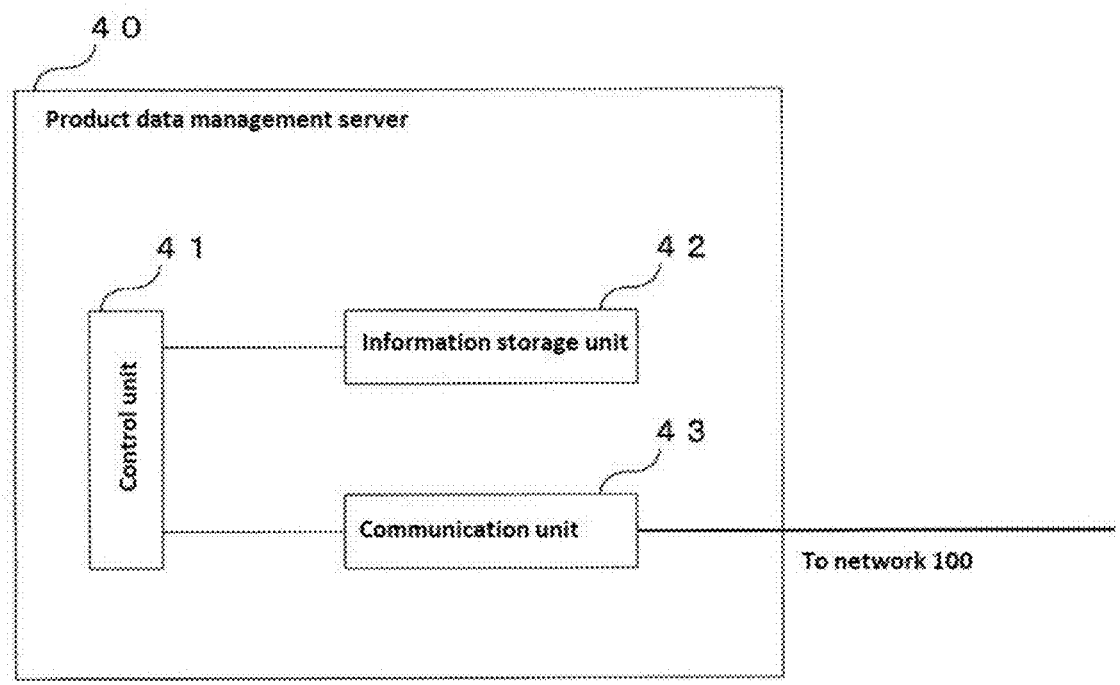
FIG. 9 is a diagram showing a configuration of a product data management server according to the first embodiment of the invention.

FIG. 9 is a diagram showing the configuration of the product data management server 40 according to the first embodiment of the invention.

As shown in the diagram, the product data management server 40 is comprised of a control unit 41 for controlling the entire product data management server 40, an information storage unit 42 for storing product data, and a communication unit 43 for transmitting/receiving various pieces of information to/from the measuring terminal 20.

Each of the units 41 to 43 is connected to an internal bus. Various pieces of information and the like are inputted and outputted via such a bus. Various processes are executed under the control of the control unit 41.

The control unit 41 is a processing unit responsible for controlling the entire product data management server 40, composed of an electric circuit such as a CPU (Central Processing Unit) or an integrated circuit such an FPGA (Field-Programmable Gate Array).

The control unit 41 executes readout of information from the information storage unit 42 as well as write-in of information into the information storage unit 42.

The information storage unit 42 is a device for storing information, such as a hard disk, memory, or a semiconductor element.

The information storage unit 42 has a region for storing a program executed by the control unit 41, a working region (RAM or the like) that is temporarily used when the control unit 41 executes a process, or the like.

The control unit 41 reads out a program stored in the information storage unit 42 and deploys the program in the working region to execute various processes.

The communication unit 43 is an interface for controlling communication with the measuring terminal 20 via the network 100, having a LAN adapter or the like.

The communication unit 43 can comprise a wireless transceiver and be connected to LAN, Internet, or the like via wireless communication, or can be connected via a wire such as a cable.

Figure 10:
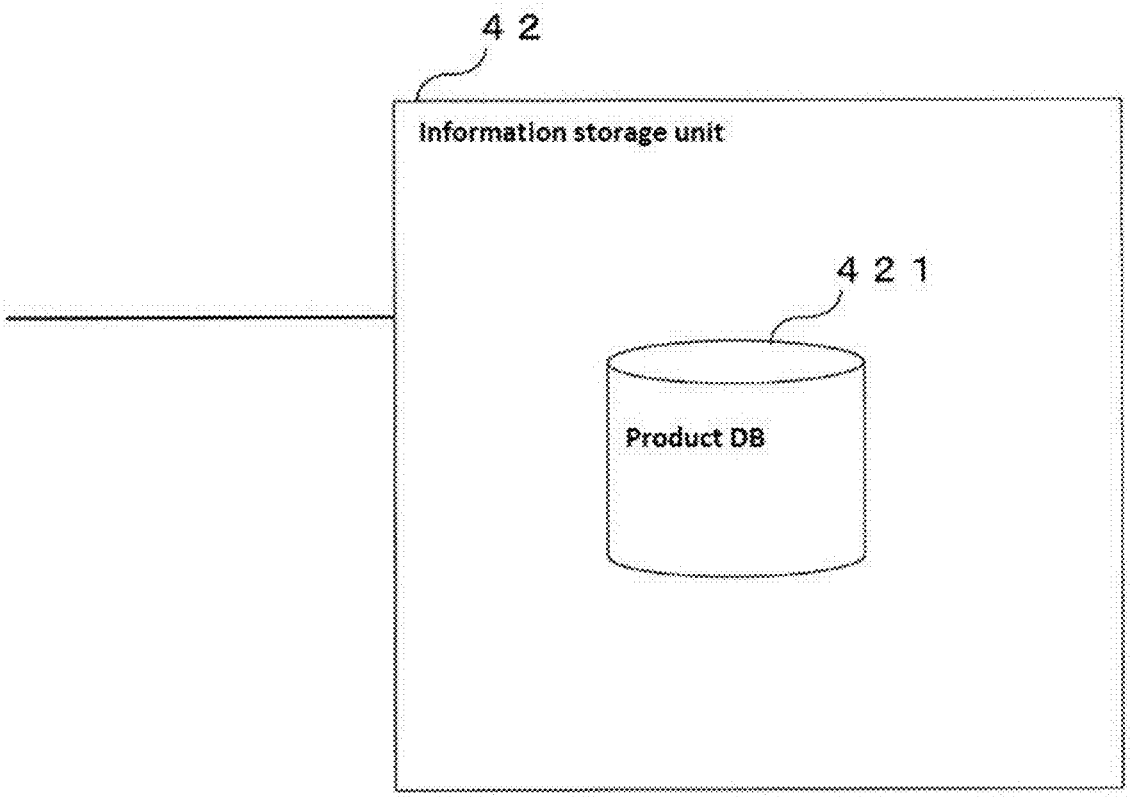
FIG. 10 is a diagram showing data or the like stored by an information storage unit of a product data management server according to the first embodiment of the invention.

FIG. 10 is a diagram showing data or the like stored by the information storage unit 42 of the product data management server 40 according to the first embodiment of the invention.

As shown in the diagram, the information storage unit 42 stores a product DB 421 for managing product data.

FIG. 11 is a diagram showing an example of a data configuration of the product DB 421 according to the first embodiment of the invention.

In the example shown in the diagram, the product DB 421 manages names of apparel products, brands supplying the apparel products, the product categories, size information, colors of the apparel products, prices of the apparel products, and number of the apparel products in stock while associating the data with an ID (product ID) for identifying each apparel product.

The product category is an entry representing the category to which an apparel product belongs. Examples of apparel products categories include tops, pants, one-pieces, light outerwear, heavy outerwear, hats, bags, fashion ornaments, accessories, shoes, and the like.

Product categories can be designed to have multiple levels, such as broad category→narrow category. For example, a broad category of "tops" can include narrow categories "T-shirts", "polo shirts", "parkers", and the like, so that an apparel product category is designed to be subdivided into narrower categories.

The size information is an entry representing the size of an apparel product.

Size information includes the overall size such as the general size denotations S, M, and L, as well as information on dimensions of each part such as the bust, waist, hip, dress length, shoulder width, sleeve length, inseam, thigh circumference, and the like.

[3] Operation of the First Embodiment (1) Operation of Manufacturing the Size Measuring Apparatus 10

Figure 12:
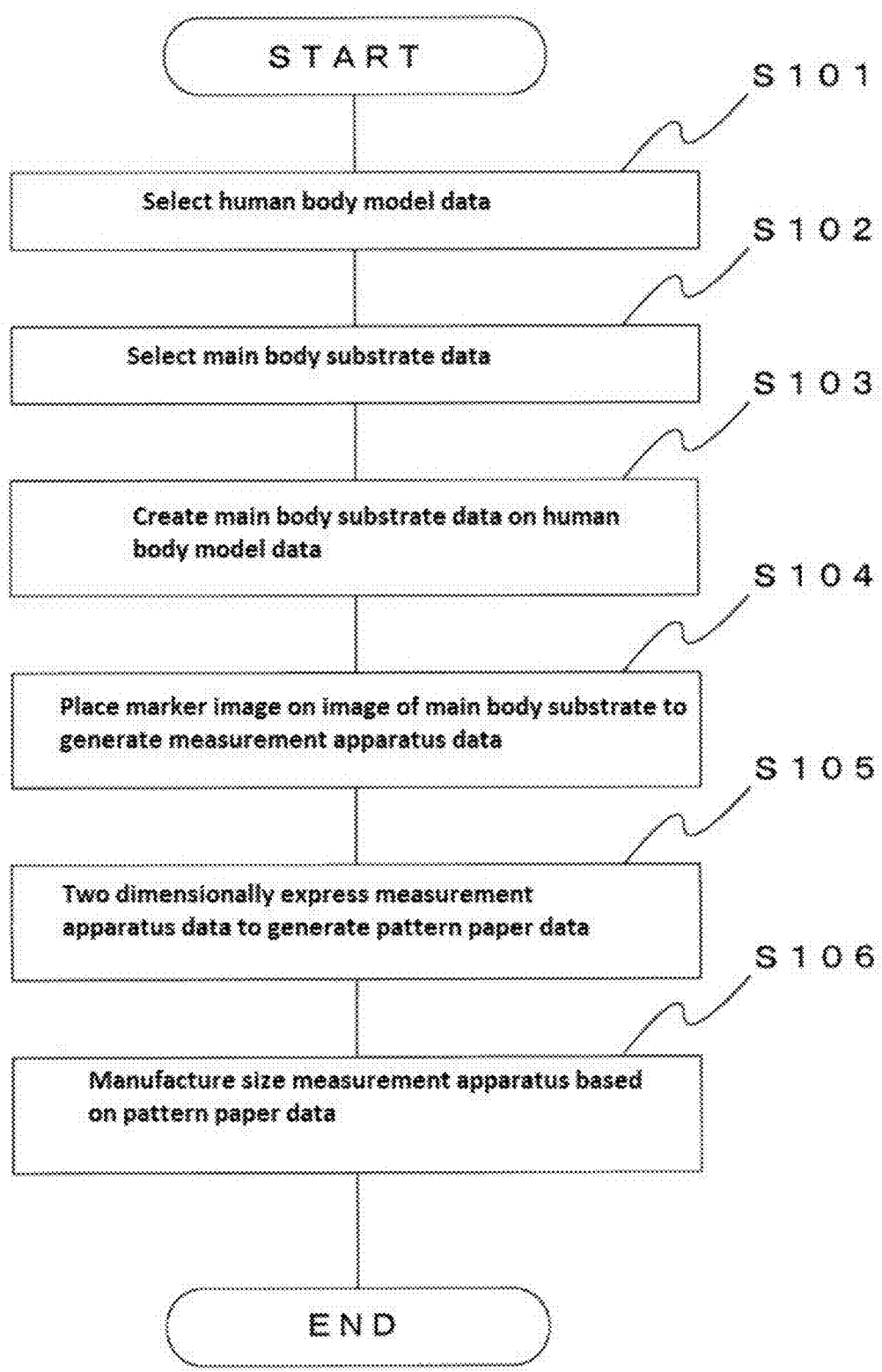
FIG. 12 is a flowchart showing the flow of the operation of manufacturing a size measuring apparatus according to the first embodiment of the invention.

FIG. 12 is a flowchart showing the flow of the operation of manufacturing the size measuring apparatus 10 according to the first embodiment of the invention.

The operation is described along with the diagram hereinafter.

First, a service provider operates the operation unit 35 of the provider terminal 30 to display a list of human body model data stored in the information storage unit 35 on the display unit 34, and selects the human body model data of a suitable human body model using the operation unit 35 (step S101).

For example, the service provider selects human body model data for an adult female with a normal body shape.

Figure 13:
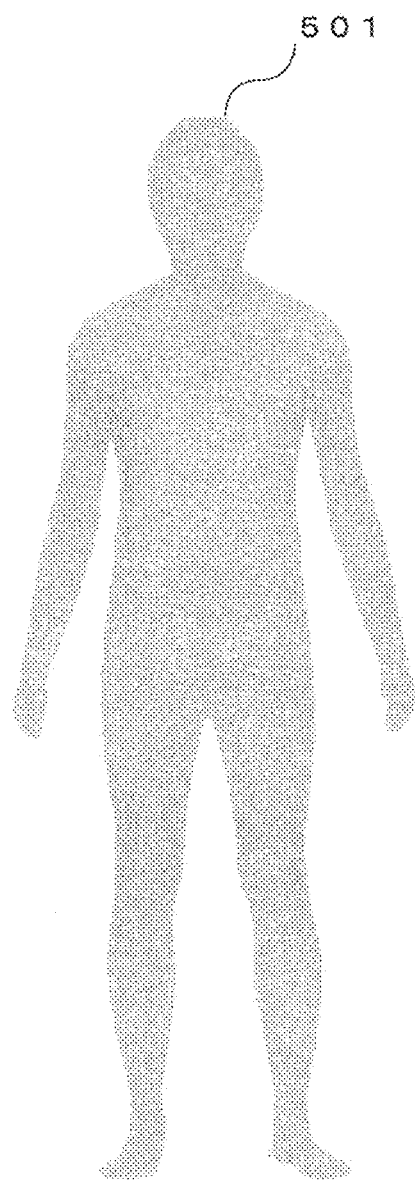
FIG. 13 is a diagram showing an example of a three-dimensional image of a human body model represented by human body model data according to the first embodiment of the invention.

FIG. 13 is a diagram showing an example of a three-dimensional image 501 of a human body model represented by human body model data according to the first embodiment of the invention.

The diagram shows the three-dimensional image 501 of a common human body model.

The service provider then operates the operation unit 35 of the provider terminal 30 to display a list of main body substrate data stored in the information storage unit 35 on the display unit 34, and selects suitable main body substrate data using the operation unit 35 (step S102).

For example, the service provider selects main body substrate data representing the shirt-like main body substrate 11.

The service provider then operates the operation unit 35 to create an image of the selected main body substrate data onto an image of the selected human body model data (step S103).

In this regard, the service provider operates the operation unit 35 to match the predetermined three-dimensional coordinates of the selected human body model data with the predetermined three-dimensional coordinates of main body substrate data to generate an image of a human body model wearing the main body substrate 11 on the provider terminal 30.

The technology for creating an image of a garment or the like on a human body image is not particularly limited and can be a conventional technology.

Expansion, contraction, rotation, and other processing can be appropriately applied to an image of a main body substrate in accordance with the size or shape of an image of a human body model.

The service provider then operates the operation unit 35 to set the placement positions of the markers 12 to any position on the image of the main body substrate 11 created on the image of the human body model (step S104).

For example, when the operation unit 35 is comprised of a mouse or the like, a given position on an image of the main body substrate 11 displayed on the display unit 34 is clicked to set the placement positions of the markers 12.

As described above, the markers 12 are identifiable from one another from the shape, pattern, or the like, and have a preset marker ID, which is an identification number.

To set the placement positions of the markers 12, the service provider selects the marker ID of the marker 12 to be set and set the placement position of the marker 12.

Once the placement positions of the markers 12 are set, the control unit 31 generates measuring apparatus data indicating the three-dimensional coordinates of a group of points representing the surface shape of the main body substrate 11, three-dimensional coordinates of points indicating the placement positions of the markers 12 among the group of points, and identification numbers of the markers 12 (step S104).

In the measuring apparatus data, the coordinates of the points at the placement positions of the markers 12 and identification numbers of the markers 12 are associated with each other, thus indicating what type of marker 12 is placed on which position on the main body substrate 11.

In actuality, the markers 12 have a greater size than a point in a group of points, such as a circular shape of about 10 to 30 mm. Therefore, the center or center of gravity of the outer shape of the markers 12 or the like can be the placement position thereof.

Figure 14:
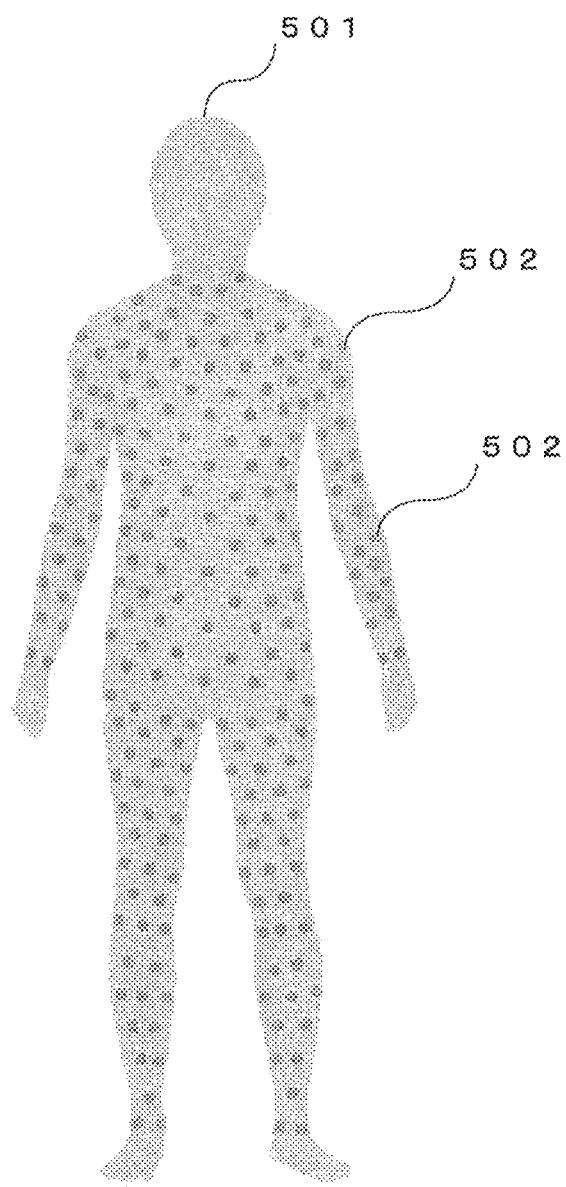
FIG. 14 is a diagram showing an example of a three-dimensional image of a human body model represented by human body model data after setting the placement positions of markers according to the first embodiment of the invention.

FIG. 14 is a diagram showing an example of the three-dimensional image 501 of a human body model represented by human body model data after setting the placement positions of the markers 12 according to the first embodiment of the invention.

In the example of the diagram, images 502 of the placement positions of the markers 12 are shown at positions set on the three-dimensional image 501 of a human body model.

The control unit 31 of the provider terminal 30 then generates pattern paper data for manufacturing the size measuring apparatus 10 based on the generated measuring apparatus data (step S105).

Specifically, the control unit 31 converts three-dimensional coordinates of the main body substrate 11 indicated by measuring apparatus data into planar coordinates to generate pattern paper data for creating the size measurement apparatus 10.

The control unit 31 also converts three-dimensional coordinates of placement positions of the markers 12 into planar coordinates of pattern paper. Pattern paper data includes information indicating what type of marker 12 is placed at which position on the pattern paper.

Pattern paper data generated in this manner includes image data of pattern paper for creating the size measuring apparatus 10. The data includes planar coordinates indicating the outer shape of the pattern paper as well as planar coordinates converted from three-dimensional coordinates of measuring apparatus data at the portion of the pattern paper image.

When the service provider operates the operation unit 35 to input a request to display pattern paper data, the control unit 31 displays the relevant pattern paper data on the display unit 34.

Figure 15:
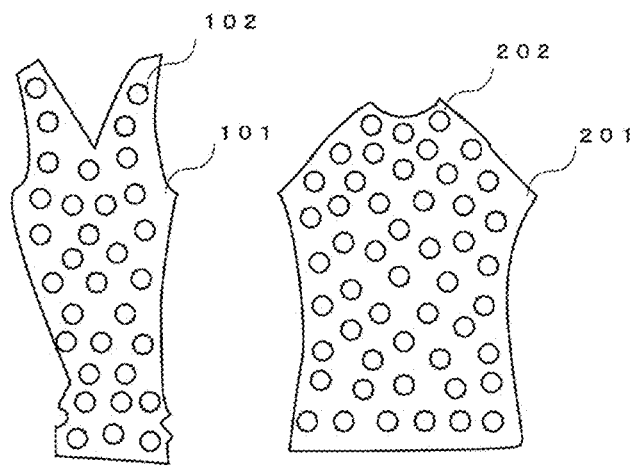
FIG. 15 is a diagram showing an example of pattern paper data according to the first embodiment of the invention.

FIG. 15 is a diagram showing an example of pattern paper data according to the first embodiment of the invention.

As shown in the diagram, pattern paper data comprises pattern paper information 101, 201 of the main body substrate 11 for manufacturing the size measuring apparatus 10, and information 102, 202 on placement positions of the markers 12.

The planar coordinates of sewing positions on the main body substrate 11 displayed in the pattern paper can be set within pattern paper data by a service provider input using the operation unit 35.

For example, the service provider can generate planar coordinates of sewing positions within the pattern paper data by operating the operation unit 35, such a mouse, and tracing a given position on a pattern paper image of the main body substrate 11 that is displayed.

A device (not shown) for manufacturing the size measuring apparatus 10 then manufactures the size measuring apparatus 10 by using pattern paper data generated by the provider terminal 30 (step S106).

While the manufacturing method of the size measuring apparatus 10 is not particularly limited, if a device for manufacturing the size measuring apparatus 10 is for example an information processing device comprising a cutting/sewing function or the like, the markers 12 are secured onto the main body substrate 11 at positions indicated by the pattern paper data upon input of the pattern paper data. The device for manufacturing the size measuring apparatus 10 cuts and sews the material (fiber or the like) of the main body substrate 11 in accordance with the information on the outer shape of the main body substrate 11 indicated in the pattern paper data to manufacture the size measuring apparatus 10.

This completes the operation of manufacturing the size measuring apparatus 10.

(2) Operation of Measuring the Body Size of a User

FIG. 16A is a flowchart showing an example of flow 200 of the operation of measuring the body size of a user according to the first embodiment of the invention.

The operation is described along with the diagram hereinafter.

First, a person who is performing measurement captures a user wearing the size measuring apparatus 10 multiple times using the capture unit 26 of the measuring terminal 20 (step S201).

Figure 17:
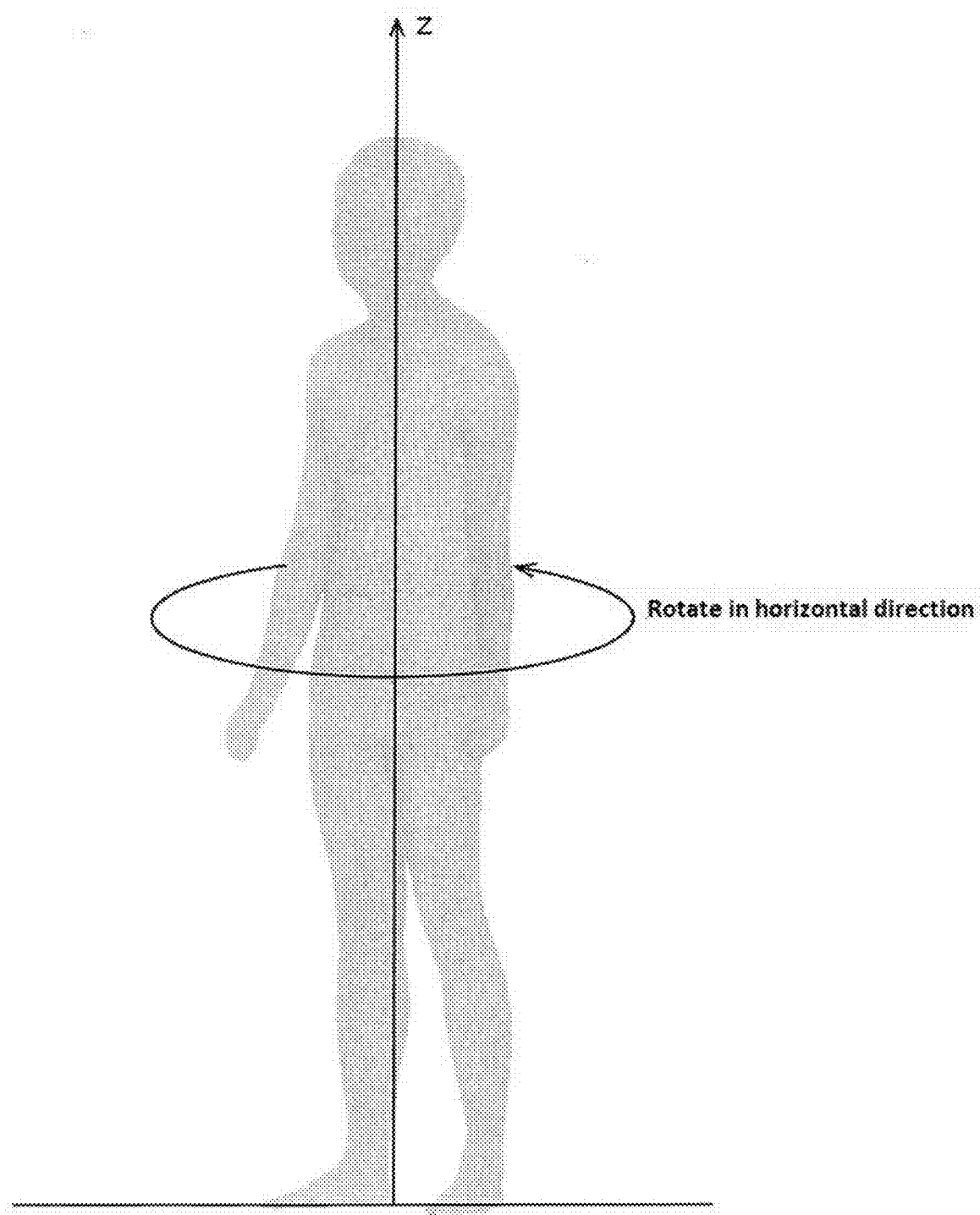
FIG. 17 is a diagram showing a user during image capture according to the first embodiment of the invention.

FIG. 17 is a diagram showing a user during image capture according to the first embodiment of the invention.

As shown in the diagram, a user is standing at an approximately horizontal place such as a floor or ground during the capture, and rotates around the axis extending upward in the vertical direction from the floor or the like on the standing position during multiple times of capture with the measuring terminal 20.

This allows the measuring terminal 20 to obtain a planar image of a side surface of the user who is wearing the size measuring apparatus 10 and is standing from multiple angles. For example, the measuring terminal 20 can obtain planar images from 12 directions by capturing the user from 12 directions (1 o'clock, 2 o'clock . . . 12 o'clock).

At this time, the measuring terminal 20 captures the user so that the same common markers 12 are included in a plurality of planar images.

The capture unit 26 inputs a plurality of pieces of planar image data generated by the capturing into the control unit 21.

The control unit 21 collates the shape or the like of each marker 12 captured within a planar image in the plurality of planar images with a shape or the like registered in the marker DB 221, executes image recognition processing, identifies each marker 12, and computes the three-dimensional coordinates of the identified markers 12 in the planar image using a three-dimensional reconstruction algorithm.

In addition, the control unit 21 executes computational processing of the three-dimensional coordinates of the markers 12 in the plurality of planar images to compute the three-dimensional coordinates of all of the markers 12 captured in the plurality of planar images (step S202).

A set of the computed three-dimensional coordinates of all of the markers 12 is the marker measurement data described above.

The method of computing the marker measurement data can be a method using conventional technology. For example, the method can focus on the markers 12 that are captured in common in a plurality of planar images, and utilize the technique of triangulation to ultimately compute the three-dimensional coordinates of the markers 12.

At this time, the control unit 21 also computes pose information indicating the capture position/direction of the measuring terminal 20.

In this regard, the control unit 21 can, for example, use a common bundle adjustment algorithm when computing the pose information of the measuring terminal 20 and three-dimensional coordinates of the markers 12 to reproject the computed three-dimensional coordinates of the markers 12 onto a planar image and iteratively find an estimate that would minimize the distance between the reprojected position of the marker 12 and the position of the marker 12 on the planar image.

The control unit 21 then executes optimization of the value of the computed marker measurement data (three-dimensional coordinates of the markers 12) using an optimization algorithm (step S203).

For example, the control unit 21 deletes coordinate values that are estimated as an error value among three-dimensional coordinates of the markers 12 indicated in the marker measurement data.

For example, the controller unit 21 then generates user measurement data representing the body shape of a user based on the optimized marker measurement data (step S204).

User measurement data includes three-dimensional coordinates of a group of points representing the body surface of a user.

At this time, the control unit 21 estimates that the markers 12 are positioned on the body surface of the user and computes the three-dimensional coordinates of the group of points representing the body surface of the user based on the three-dimensional coordinates of each marker 12 to compute the user measurement data.

The control unit 21 then computes measurement size data based on the computed user measurement data (step S205).

Measurement size data is data representing the size of a given body part of a user, which is size data for body parts that should be considered when purchasing an apparel product, such as height, bust size, waist size, hip size, shoulder width, and inseam.

Data for a human body model is stored in the information storage unit 22. If the position of the size of the body part is set in the human body model, the control unit 21 can collate the human body model with the body shape of a user represented by the user measurement data and identify the position of the size in the body shape of the user to extract and compute the values of three-dimensional coordinates at the position of the size and compute the size of each body part of the user.

This completes the operation of measuring the body size of a user.

FIG. 16B is a flowchart showing an example of processing 300 for measuring the body size in another example of the flow 200 of an operation of measuring the body size of a user described above. Processing 300 is executed in the control unit 21 of the measuring terminal 20.

Before step S301, the same operation as step S201 is performed. This enables a plurality of images capturing a user wearing the size measuring apparatus 10 from a plurality of directions to be obtained. The obtained images of the user are inputted into the control unit 21 from the capture unit 26.

Once the images of a user are inputted into the control unit 21, the control unit 21 receives the images of the user (step S301).

Once the images of the user are received, the 3D model constructing means 211 of the control unit 21 constructs a 3D model by modifying the shape of a default 3D model based on the default 3D model and received images (step S302). The 3D model constructing means 211 constructs a 3D model of a user by, for example, modifying the shape of the default 3D model based on a virtual image obtained from the default 3D model and received images. For example, the 3D model constructing means 211 can construct a 3D model by processing 400 described below. The 3D model constructing means 211 can modify the shape of a default 3D model within a virtual three-dimensional space, which is a space generated from expanding or contracting an actual three-dimensional space at a predetermined scale.

When a 3D model is constructed, the measuring means 212 of the control unit 21 measures the body size in the constructed 3D model (step S303). The measuring means 212 measures the body size in a virtual three-dimensional space. The measuring means 212 can measure the body size of a 3D model using a known methodology.

Once the body size is measured, the converting means 213 of the control unit 21 converts the measured body size into the actual body size (step S304). For example, the converting means 213 converts the body size in a virtual three-dimensional space into a size in an actual three-dimensional space using a scale between the virtual three-dimensional space and the actual three-dimensional space. If, for example, the scale between the virtual three-dimensional space and actual three-dimensional space is X:Y, and the body size in the virtual three-dimensional space measured by the measuring means 212 is measured to be h, the body size h in the virtual three-dimensional space is converted into the size in the actual three-dimensional space by multiplying by Y/X (i.e., h×Y/X).

When converted into an actual body size, the processing 300 for measuring the body size is complete. The control unit 21 then computes the measurement size data representing the size of a given body part of a user based on the actual body size.

FIG. 16C is a flowchart showing an example of processing 400 for the 3D model constructing means 211 to construct a 3D model in step S302.

The 3D model constructing means 211 obtains a virtual image from a default 3D model (step S401). A virtual image is an image that has virtually captured a default 3D model from a plurality of directions. At this time, a received image is preferably an image captured from the same or close to the direction from which the virtual image is captured. This is because comparison of the virtual image and the received image can be facilitated in subsequent processing. For example, when a virtual image is an image virtually capturing a default 3D model from 12 directions including the direction of 1 o'clock, 2 o'clock . . . 12 o'clock with respect to the default 3D model, it is preferable to capture a user so that the received image also captures the user from 12 directions including the direction of 1 o'clock, 2 o'clock . . . 12 o'clock with respect to the user. Furthermore, the camera position from which the received image is captured is preferably the same or close to the camera position from which a virtual image is virtually captured. This is because comparison of the virtual image and the received image can be facilitated in subsequent processing. For example, if a virtual image is virtually captured from a camera position with a distance of about 2 m from a subject and a camera height of about 70 cm, a user is preferably captured so that the received image is also captured from a virtual camera position with a distance of about 2 m from a subject and a camera height of about 70 cm.

The 3D model constructing means 211 then computes the discrepancy between a marker within the virtual image and a corresponding marker within the received image (step S402). The discrepancy between a marker within the virtual image and a corresponding marker within the received image can be computed, for example, at a pixel level.

The discrepancy between a marker within a virtual image and a corresponding marker within a received image can result from, for example, a difference in the body shape of a default 3D model within the virtual image and the body shape of a user within an image, difference between the orientation of a default 3D model within the virtual image and the orientation of a user within an image, difference between the position and tilt of the camera that has captured the virtual image and the position and tilt of the camera that has captured an image, or difference between the position of a marker within the virtual image and the position of a marker within an image due to clothing being twisted. Therefore, the discrepancy $ERR_i$ between a marker i within a virtual image and a corresponding marker i within a received image can be represented by, for example, $$ERR_i=ERR_i(\text{body shape})+ERR_i(\text{camera position})+ERR_i(\text{orientation})+ERR_i(\text{twist}) \quad (1).$$

For example, the difference between the body shape of a default 3D model within a virtual image and the body shape of a user within an image can be expressed by a difference in the X coordinates of a pixel at the left end of a marker and a difference in the Y coordinates of a pixel at the top end of a marker. This is because the positions of the markers themselves must be offset if the body shape of a default 3D model within a virtual image is different from the body shape of a user within an image. Such a difference $ERR_i$ (body shape) between the body shape of a default 3D model within a virtual image and the body shape of a user within an image can be represented by $$ERR_i(\text{Body Shape})=ABS(X_id-X_ia)+ABS(Y_id-Y_ia) \quad (2),$$

wherein ABS ( ) represents an absolute value, $(X_id, Y_id)$ represents positional coordinates of marker i within a virtual image, and $(X_ia, Y_ia)$ represents positional coordinates of marker i within a received image.

For example, the difference between the position of the camera that has captured a virtual image and the position of the camera that has captured an image can be expressed by the difference in the horizontal widths of markers and the difference in the vertical widths of markers. This is because the marker sizes must be different if the position of the camera that has captured the virtual image is different from the position of the camera that has captured the image. Such a difference $ERR_i$ (camera position) between the position of the camera that has captured a virtual image and the position of the camera that has captured an image can be expressed by $$ERR_i(\text{camera position})=ABS(W_id-W_ia)+ABS(H_id-H_ia) \quad (3),$$

wherein ABS ( ) represents an absolute value, $(W_id, H_id)$ represents the horizontal width and the vertical width of marker i within the virtual image, and $(X_ia, Y_ia)$ represents the horizontal width and the vertical width of marker i within the received image.

The 3D model constructing means 211 computes the discrepancy between a marker within a virtual image and a corresponding marker within a received image for all of the plurality of markers to compute the total value of discrepancies ERR.

$$ERR=\Sigma ERR_i \quad (4)$$

If a plurality of images captured from a plurality of directions have been received at step S401 at this time, received images and virtual images captured from the same direction can be grouped into a set, and the discrepancy between a marker within the virtual image and the corresponding marker within the received image can be computed for each set.

The 3D model constructing means 211 then modifies the shape of a default 3D model such that the discrepancy ERR computed in step S403 is minimized (step S403). The 3D model constructing means 121 can derive a modification that minimizes discrepancy ERR by using, for example, the least square method.

If, for example, equation (1), equation (2), and equation (3) are substituted into formula (4), ERR can be represented by a polynomial equation using the positional coordinates ($X_id$, $Y_id$) or width ($W_id$, $H_id$) of a plurality of markers of a default 3D model or the like as a variable. With $X_id$, $Y_id$, $W_id$, $H_id$, or the like for each marker as a variable in this polynomial equation, $X_id$, $Y_id$, $W_id$, $H_id$, or the like that minimizes ERR can be found using the least square method. The 3D model constructing method 211 modifies the shape of a default 3D model so that a plurality of markers on a 3D model after the modification has $X_id$, $Y_id$, $W_id$, $H_id$, or the like which minimizes ERR.

The 3D model constructing means 211 determines whether the discrepancy ERR is less than or equal to a predetermined threshold value (step S404). If the discrepancy ERR is less than or equal to a predetermined threshold value, the 3D model after the modification is determined as a 3D model of a user. This completes the processing 400. If the discrepancy ERR is greater than the predetermined threshold value, the process proceeds to step S405. In this regard, the predetermined threshold value can be, for example, 0, or any non-zero value.

If the discrepancy ERR is greater than the predetermined threshold value, the 3D model constructing means 211 obtains a virtual image from the modified 3D model (step S405). The virtual image is an image that has virtually captured the modified 3D model from a plurality of directions. A virtual image obtained from a modified 3D model is preferably captured from the same direction and/or position as the received image in the same manner as a virtual image obtained from a default 3D model.

The 3D model constructing means 211 then repeats step S402 to step S404 using a virtual image obtained from the modified 3D model and the modified 3D model. This is repeated until the discrepancy ERR is less than or equal to the predetermined threshold value.

A 3D model of a user is constructed in this manner.

The aforementioned example describes that step S402 to step S405 are repeated until the discrepancy is less than or equal to the predetermined threshold value, but the present invention is not limited thereto. For example, step S402 to step S405 can be repeated only a predetermined number of times, or step S402 to step S405 can be repeated until the discrepancy is less than or equal to the predetermined threshold value or a predetermined number of repeats is reached.

A user can use measurement size data computed by the measuring terminal 20 to search for an apparel product matching the user's size and purchase the product directly from an electronic commerce site.

If a user operates the operation unit 25 of the measuring terminal 20 to transmit the user's measurement size data to the product data management server 40, the product data management server 40 executes a search for a product that meets the body size (size is a match or close) of the user indicated in the measurement size data while referencing a product DB.

Moreover, the product data management server 40 generates, as a result of the search, product search result information (web data), which is screen information including extracted data on products, and transmits the information to the measuring terminal 20.

The measuring terminal 20 displays the product search result information when the information is received from the product data management server 40.

A user can review the apparel product shown in the product search result information to consider purchase of the product. If the product search result information is on a web page of an electronic commerce site, the user can also purchase the apparel product by clicking on a button displayed on the product search result information by using the operation unit 25 or the like. Since the processing for purchase on an electronic commerce site is the same as known processing, the description thereof is omitted.

Summary of the Embodiment

As described above, the measuring terminal 20 in the size measuring system according to the first embodiment of the invention computes three-dimensional coordinates of the plurality of markers 12 placed on the surface of the size measuring apparatus 10 by capturing the markers 12 from a plurality of angles while a user wears the size measuring apparatus 10, and computes the size of each body part of the user based thereon. Thus, users can readily find the size of a body part without a cumbersome process of measuring each body part by themselves with a tape measure or the like.

According to this embodiment, once data on the size of a body part of a user is received from the measuring terminal 20, the product data management server 40 references a product DB, extracts data on an apparel product whose size matches or is within a predetermined range of the size of each body part, generates screen information showing data on the product, and transmits the information to the measuring terminal 20. Thus, users can readily find an apparel product that matches their sizes.

According to this embodiment, the size measuring apparatus 10 is composed by placing and securing the plurality of markers 12 composed of a material that is inelastic and unmodifiable on the main body substrate 11 composed of a freely stretchable material. Thus, when a user wears the size measuring apparatus 10, the main body substrate 11 extends to match the body shape of the user and fits snugly, and the markers 12 change their positions in accordance with the extension of the main body substrate 11. Thus, when the measuring terminal 20 computes the positions (three-dimensional coordinates) of the markers 12, measurement of the body size of a user can be executed in accordance therewith.

As described above, the markers 12 are themselves inelastic and unmodifiable, so that the measuring terminal 20 can recognize an image of the markers 12 with a high level of precision.

According to this embodiment, the provider terminal 30 creates a three-dimensional image of the main body substrate 11 of the size measuring apparatus 10 on a human body model, and then selects the type of markers 12, places the markers 12 on the three-dimensional image of the main body substrate 11, generates measurement apparatus data that is the design data for the size measuring apparatus 10 to be manufactured, and generates pattern paper data for the size measuring apparatus 10 based on the measurement apparatus data. Therefore, a service provider can readily manufacture the size measuring apparatus 10.

The measuring terminal 20, provider terminal 30, and product data management server 40 are materialized primarily with a CPU and a program loaded into the memory. However, the device or server can be comprised of a combination of any other hardware and software. Those skilled in the art can readily understand the high degree of freedom in the design thereof.

When the measuring terminal 20, provider terminal 30, or product data management server 40 is configured as a software module group, the program can be configured to be recorded on a recording medium such as an optical recording medium, magnetic recording medium, photomagnetic recording medium, or semiconductor and loaded from the recording medium, or loaded from an external equipment connected via a predetermined network.

The aforementioned embodiment is an example of a suitable embodiment of the invention. The embodiment of the invention is not limited thereto. Various modifications can be applied to the extent that the embodiment does not delineate from the spirit of the invention.

When the measuring terminal 20 reads out the plurality of markers 12 provided on the surface of the size measuring apparatus 10, it is possible to determine which position of the size measuring apparatus 10 each of the markers 12 is provided.

To identify each of the markers 12, each of the markers 12 can be configured so that, for example, the shape, size, surface design (pattern), color tone, or material is, individually or as a combination thereof, different from each other among each of the markers 12.

In this manner, each marker 12 can be configured to have different surface design or the like from one another so that each marker comprises a unique identification element, or some identification elements of the markers 12 can overlap in the same size measuring apparatus 10.

For example, the measuring terminal 20 can also identify an identification element of another marker 12 placed around a marker 12 subjected to identification to identify each of the markers 12 by combining identification elements of the plurality of markers 12.

In a specific example of such a case, the measuring terminal 20 can recognize that markers 12 with the same identification element are different markers 12 from each other between a case where a marker 12 with identification element B is placed within a 5 cm radius of marker 12 with identification element A and a case where marker 12 with identification element C is placed within a 5 cm radius of marker 12 with identification element A.

When such an identification method is used, identification elements of surrounding markers are also managed in the marker DB 221 for each marker.

The measuring terminal 20 can also identify the markers 12 by the following method.

The measuring terminal 20 recognizes a boundary between the size measuring apparatus 10 and the background, and measures the distance from a predetermined position on the boundary to the placement positions of each marker 12.

The measuring terminal 20 identifies markers by combining information on the distance from a predetermined position on a boundary to the placement position of each marker 12 with identification elements of the markers 12.

For example, the distance from the boundary is different between the marker 12 placed at the center portion of the torso of the size measuring apparatus 10 and the marker 12 placed at the tip of a sleeve. Thus, the measuring terminal 20 can identify markers, even if the identification elements of these markers 12 are identical.

When such an identification method is used, information on for example the shortest distance to the boundary is also managed in the marker DB 221 for each marker 12.

The measuring terminal 20 can also identify the markers 12 by the following method.

When markers are identified by the following method, planar or three-dimensional image information of the size measuring apparatus 10 is stored in the measuring terminal 20 in advance. An image of the size measuring apparatus 10 is managed as an image divided into a plurality of regions such as the torso portion, right sleeve portion, and left sleeve portion.

The measuring terminal 20 can identify the outer shape of the size measuring apparatus 10 when the boundary between the size measuring apparatus 10 and the background is recognized as described above.

The measuring terminal 20 can recognize a captured image of the size measuring apparatus 10 divided into a plurality of regions such as the region of the torso, region of the right sleeve, region of the left sleeve . . . by utilizing the information on the identified outer shape of the size measuring apparatus 10 and image information on the size measuring apparatus 10 with divided regions stored in the information storage unit 22 in advance.

The measuring terminal 20 can identify each of the recognized markers 12, even if the identification elements of the markers 12 are the same if the recognized regions are different, by identifying the region where the markers have been recognized (torso portion, right sleeve portion, left sleeve portion, or the like) in combination with the identification element of the markers 12.

When such an identification method is used, information on the region in the size measuring apparatus 10 where a marker is placed is also managed in the marker DB 221 for each marker 12.

The measuring terminal 20 can also correct the three-dimensional coordinates of the markers 12 by using the boundary between the size measuring apparatus 10 and the background when the boundary is recognized from an image as described above.

When, for example, the measurement terminal 20 has recognized that three-dimensional coordinates of the marker 12 are located outside of a closed boundary representing the outer shape of the size measuring apparatus 10, the precision of measurement of the body size of a user can be improved by determining the three-dimensional coordinates of such markers 12 as an error value and deleting the coordinates or moving the coordinates to the boundary.

Second Embodiment

Figure 18:
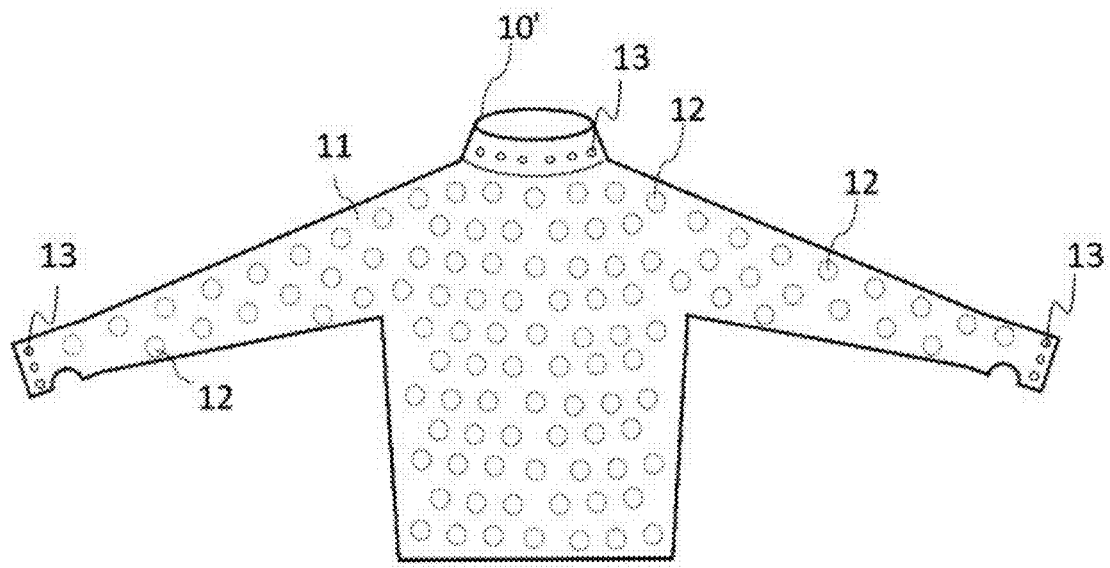
FIG. 18 is a diagram showing the outer appearance of a size measuring apparatus according to the second embodiment of the invention.
Figure 19:
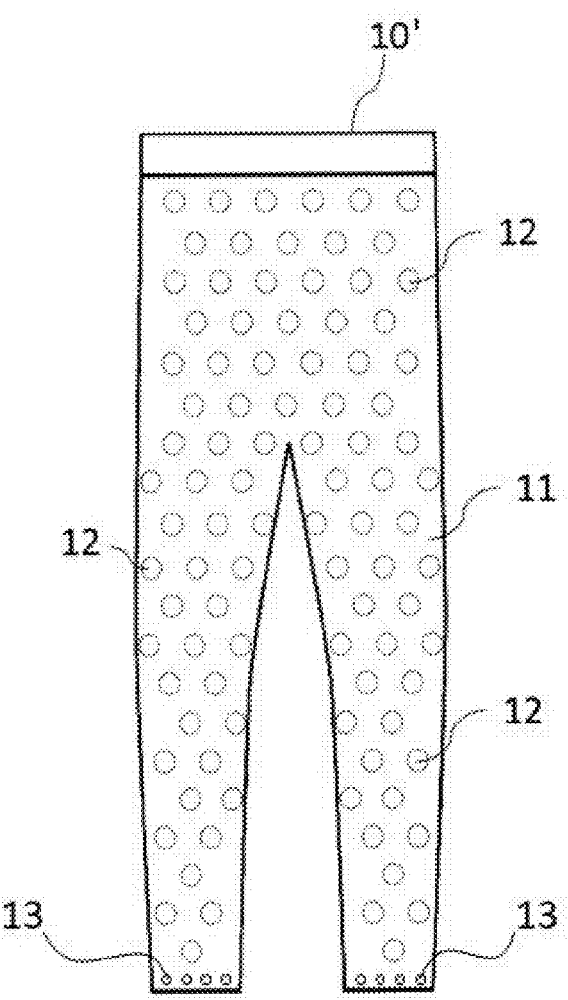
FIG. 19 is a diagram showing the outer appearance of a size measuring apparatus according to the second embodiment of the invention.

FIGS. 18 and 19 are diagrams showing the outer appearance of a size measuring apparatus 10' according to the second embodiment of the invention. FIG. 18 shows a shirt-like size measuring apparatus 10' as an example, and FIG. 19 shows a pant-like size measuring apparatus 10' as an example. In FIGS. 18 and 19, the same reference number is assigned to an element that is identical to the element shown in FIGS. 2 and 3. The description thereof is omitted in this section.

The size measuring apparatus 10' comprises a plurality of markers 12 and 13. As described above, the plurality of markers 12 can be unique within the size measuring apparatus 10', whereas the plurality of markers 13 can be non-unique within the size measuring apparatus 10'. Specifically, the plurality of markers 13 can have the same shape, size, surface design (pattern), color tone, material, or the like with one another.

The plurality of markers 12 and the plurality of markers 13 can have the same or different size from each other. For example, both the plurality of markers 12 and the plurality of markers 13 can be circular with the same diameter, or the markers can be circular with the plurality of markers 12 having a larger or smaller diameter than the plurality of markers 13. In one Example, the plurality of markers 12 can have a diameter of about 20 mm, whereas the plurality of markers 13 can have a diameter of about 10 mm. The plurality of markers 12 and the plurality of markers 13 can have the same or different shape from each other. For example, the plurality of markers 12 can be circular, whereas the plurality of markers 13 are polygonal.

The plurality of non-unique markers 13 can be placed at any position on a main body substrate. If for example a user wears the size measuring apparatus 10', the plurality of non-unique markers 13 can be placed on a main body substrate to be located on at least one of a wrist, ankle, and neck of the user. In the examples shown in FIGS. 18 and 19, the plurality of non-unique markers 13 are placed on a main body substrate to be located on the wrist, ankle, and neck of a user. The plurality of non-unique markers 13 placed in this manner can be utilized as a visual guide for a user. For example, when a user wears the size measuring apparatus 10', the user can wear the size measuring apparatus 10' so that the plurality of non-unique markers 13 are located at the wrist, ankle, and neck.

In the second embodiment, a measuring terminal can have a configuration for identifying the plurality of non-unique markers 13 in addition to the same configuration as the measuring terminal 20 in the first embodiment. For example, 3D model constructing means of a control unit of a measuring terminal of the second embodiment can have a configuration for identifying the plurality of non-unique markers 13 in addition to the same configuration as the 3D model constructing means 211 of the measuring terminal 20 in the first embodiment.

A 3D model constructing means of the second embodiment can be configured, for example, to identify each of the plurality of non-unique markers 13 from the relative relationship with the plurality of unique markers 12. For example, a 3D model constructing means of the second embodiment can identify the non-unique markers 13 from the positional relationship with one or a plurality of nearby unique markers 12. For example, this allows a 3D model constructing means of the second embodiment to associate non-unique markers within a default 3D model with non-unique markers within a received image, and to compute the discrepancy between the non-unique markers within the default 3D model and the associated non-unique markers within the image.

This enables a measuring terminal of the second embodiment to measure the body size of a user by the same processing as that of the measuring terminal 20 of the first embodiment.

In the embodiments explained above, it was described that the measuring terminal 20 measures the body size of a user by computing the three-dimensional coordinates of the markers 12 and the body of the user and computing the body size of the user, but the present invention is not limited thereto. The body size of a user can be measured with any computer system having the same configuration as the control unit 21 of the measuring terminal 20 described above. For example, the body size of a user can be measured in a server (e.g., provider terminal 30 of a service provider, product data management server 40, or server that is not shown). In such a case, the system can be configured so that the measuring terminal 20 transmits captured planar image data to a server, and the server executes processing up to computation of measurement size data based on the received planar image data in place of the measuring terminal 20.

In such a case, the server can transmit the computed measurement size data to the measuring terminal 20, or search for an apparel product matching the body size of the user and transmit the product search result information to the measuring terminal 20 in place of the product data management server 40.

Each data and content of each database content described in this embodiment are merely an example that can be changed when appropriate.

The above example describes that the body size of a user is measured, but the present invention is not limited thereto. The size measuring system of the invention can measure the size of any three-dimensional object. Any three-dimensional object can be, for example, an organism such as an animal or a subject that is not an organism. The size measuring system of the invention can be configured to measure the size of the entire three-dimensional object, or the size of a part of a three-dimensional object. The size measuring apparatuses 10 and 10' of the invention are worn at a portion of a three-dimensional object where the size is to be measured (i.e., entire three-dimensional object or a part thereof). The size measuring system of the invention can measure the size of a three-dimensional object by processing that is the same as the processing described above.

REFERENCE SIGNS LIST

10 Size measuring apparatus
11 Main body substrate
12 Markers
20 Measuring terminal
21, 31, 41 Control unit
22, 32, 42 Information storage unit
23, 33, 43 Communication unit
24, 34 Display unit
25, 35 Operation unit
26 Capture unit
30 Provider terminal
40 Product data management server
100 Network
101, 201 Pattern paper information of main body substrate
102, 202 Information on placement positions of markers
221 Marker DB
222, 321 Human body model data
322 Main body substrate data
323 Marker data
421 Product DB
501 Three-dimensional image of a human body model
502 Image of placement positions of marker

The invention claimed is:

1. A computer system for measuring a size of a three-dimensional object, the computer system comprising:
   receiving means for receiving an image of a three-dimensional object, the image being an image capturing the three-dimensional object wearing a size measuring apparatus having a plurality of markers, wherein a combination of each marker of the plurality of markers and other markers disposed around the marker is unique within the size measuring apparatus; and
   3D model constructing means for constructing a 3D model of the three-dimensional object by modifying a shape of a default 3D model having a plurality of markers corresponding to the plurality of markers based on the default 3D model and the received image.

2. The computer system of claim 1, wherein the 3D model constructing means constructs the 3D model of the three-dimensional object by modifying the shape of the default 3D model based on a virtual image obtained from the default 3D model and the received image.

3. The computer system of claim 2, wherein the 3D model constructing means is configured to:
compute a discrepancy between a plurality of markers within the virtual image and corresponding markers within the received image; and
construct the 3D model by modifying the shape of the default 3D model such that the discrepancy is minimized.

4. The computer system of claim 1, further comprising:
measuring means for measuring a size in the 3D model; and
converting means for converting the measured size into an actual size;
wherein the shape of the default 3D model is modified within a virtual three-dimensional space whose scale with respect to an actual three-dimensional space is predetermined, and
wherein the converting means converts the measured size into an actual size by using the scale.

5. The computer system of claim 4, wherein the scale between the virtual three-dimensional space and the actual three-dimensional space is predetermined by a ratio of a size of a plurality of markers of the default 3D model within the virtual three-dimensional space to a size of the plurality of markers of the size measuring apparatus within the actual three-dimensional space.

6. The computer system of claim 1, wherein the three-dimensional object is a human body.

7. A size measuring system comprising:
the computer system of claim 1, the computer system being a terminal device of a user; and
the size measuring apparatus.

8. The size measuring system of claim 7, wherein the size measuring apparatus comprises a stretchable main body substrate and the plurality of markers placed on the main body substrate, wherein the plurality of markers are inelastic.

9. A non-transitory computer readable medium storing a program for measuring a size of a three-dimensional object, the program being executed in a computer system having a processor, wherein the program instructs the processor to perform processing comprising:
receiving an image of a three-dimensional object, the image being an image capturing the three-dimensional object wearing a size measuring apparatus having a plurality of markers, wherein a combination of each marker of the plurality of markers and other markers disposed around the marker is unique within the size measuring apparatus; and
constructing a 3D model of the three-dimensional object by modifying a shape of a default 3D model having a plurality of markers corresponding to the plurality of markers based on the default 3D model and the received image.

10. A method of measuring a size of a three-dimensional object, comprising:
receiving an image of a three-dimensional object, the image being an image capturing the three-dimensional object wearing a size measuring apparatus having a plurality of markers, wherein a combination of each marker of the plurality of markers and other markers disposed around the marker is unique within the size measuring apparatus; and
constructing a 3D model of the three-dimensional object by modifying a shape of a default 3D model having a plurality of markers corresponding to the plurality of markers based on the default 3D model and the received image.

* * * * *